United States Patent
von Kraus et al.

(10) Patent No.: US 12,553,875 B1
(45) Date of Patent: Feb. 17, 2026

(54) SYSTEM AND METHOD FOR SENSING PLANT ELECTRICAL SIGNALS

(71) Applicant: The Electric Plant Company Inc., Detroit, MI (US)

(72) Inventors: Lee von Kraus, Detroit, MI (US); Justin Mast, Detroit, MI (US)

(73) Assignee: The Electric Plant Company Inc., Detroit, MI (US)

( * ) Notice: Subject to any disclaimer, the term of this patent is extended or adjusted under 35 U.S.C. 154(b) by 0 days.

(21) Appl. No.: 19/338,667

(22) Filed: Sep. 24, 2025

Related U.S. Application Data

(60) Provisional application No. 63/698,154, filed on Sep. 24, 2024.

(51) Int. Cl.
*G01N 33/00* (2006.01)
*G06K 7/10* (2006.01)

(52) U.S. Cl.
CPC ..... *G01N 33/0098* (2013.01); *G06K 7/10366* (2013.01)

(58) Field of Classification Search
CPC .. G01R 33/0094; G01R 33/10; G01N 27/048; G01N 27/121; G01N 27/223; G01N 33/246; A01G 9/02; A01G 25/16; A01G 27/00; A01G 7/00
See application file for complete search history.

(56) References Cited

U.S. PATENT DOCUMENTS

| | | | |
|---|---|---|---|
| 8,305,214 B2 * | 11/2012 | Hyde | A01G 9/006 47/1.01 R |
| 2009/0237212 A1 | 9/2009 | Hyde et al. | |
| 2012/0019382 A1 * | 1/2012 | Kohler | A01G 7/00 340/10.1 |
| 2012/0056722 A1 * | 3/2012 | Kawaguchi | G06K 7/10009 340/10.1 |
| 2013/0070081 A1 | 3/2013 | Lejeune et al. | |
| 2013/0221996 A1 * | 8/2013 | Poupyrev | G06F 3/011 324/705 |
| 2014/0173769 A1 | 6/2014 | Leyns et al. | |
| 2015/0027044 A1 * | 1/2015 | Redden | A01M 21/043 47/58.1 R |
| 2020/0302338 A1 | 9/2020 | Caleb et al. | |
| 2024/0295526 A1 | 9/2024 | Zamanzadeh et al. | |

OTHER PUBLICATIONS

"Cybres GmbH Research Center of Advanced Robotics and Environmental Science—Watchplant Partner", Cybres, https://watchplantproject.eu/cybres-research-center-of-advanced-robotics-and-environmental-science/, first downloaded Aug. 19, 2024.

(Continued)

*Primary Examiner* — Alvaro E Fortich
(74) *Attorney, Agent, or Firm* — Jeffrey Schox; Annabel Imbrie-Moore

(57) ABSTRACT

Variants of the system can include: an electrode module and a reader module. In variants, the system can function to record electrical signals from one or more plants (e.g., the system can function as a plant sensor), which can be used to evaluate the condition of the plant(s) and/or other elements of the environment.

20 Claims, 21 Drawing Sheets

(56) References Cited

OTHER PUBLICATIONS

"PhytlSigns 8 Channel Recorder Quick Start Guide, Issue 01", Vivent, https://vivent-biosignals.com/wp-content/uploads/2022/06/EN_Quickstart-Guide-PhytlSigns-Multi-Channel-V3.2.pdf, first downloaded Sep. 26, 2024.

Agosti, Robertd., "Touch-induced action potentials in *Arabidopsis thaliana*", Archives Des Sciences Journal 67(2):125-138, Dec. 2014.

Babikova, et al., "How rapid is aphid-induced signal transfer between plants via common mycelial networks?", Communicative & Integrative Biology, 6:6, e25904; Nov./Dec. 2013.

Baldwin, et al., "Rapid Changes in Tree Leaf Chemistry Induced by Damage: Evidence for Communication Between Plants", Science (4607), 277-279. 221, DOI: 10.1126/science.221.4607.277, Jul. 15, 1983.

Chatterjee, et al., "Exploring strategies for classification of external stimuli using statistical features of the plant electrical response", J. R. Soc. Interface, 12, Dec. 25, 2014, Nov. 2014.

Davies, E., "Action potentials as multifunctional signals in plants: a unifying hypothesis to explain apparently disparate wound responses", Plant, Cell and Environment (1987) 10, 623-631.

Fromm, et al., "The Biochemical Response of Electrical Signaling in the Reproductive System of Hibiscus Plants", Plant Physiol. (1995) 109: 375-384.

Gonzalez Jucla, et al., "Detecting stress caused by nitrogen deficit using deep learning techniques applied on plant electrophysiological data", Scientific Reports (2023) 13:9633.

Haraguchi, et al., "Diversity of Plant Actin-Myosin Systems", The Cytoskeleton Diverse Roles in a Plant's Life, Plant Cell Monographs, vol. 24, Sahi, Vaidurya Pratap, editor.; Baluška, F., editor. Cham, Switzerland : Chapter 4, pp. 49-61, Springer; 2019.

Howell, et al., "Pavement cells distinguish touch from letting go", Nature Plants, https://doi.org/10.1038/s41477-023-01418-9, May 15, 2023.

Kandasamy, Muthugapattik., "Plant Vegetative and Animal Cytoplasmic Actins Share Functional Competence for Spatial Development with Protists", The Plant Cell, vol. 24: 2041-2057, May 2012, www.plantcell.org.

Lalone, et al., "International Consortium to Advance Cross-Species Extrapolation of the Effects of Chemicals in Regulatory Toxicology", Environmental Toxicology and Chemistry, vol. 40, No. 12, pp. 3226-3233, wileyonlinelibrary.com/ETC, 2021.

Leliaert, et al., "Phylogeny and Molecular Evolution of the Green Algae", Critical Reviews in Plant Sciences, 31:1-46, 2012, ISSN: 0735-2689 print / 1549-7836 online, DOI: 10.1080/07352689.2011.615705, published online Feb. 14, 2012.

Lemieux, et al., "Ancestral chloroplast genome in Mesostigma viride reveals an early branch of green plant evolution", Nature, vol. 403, www.nature.com, Feb. 10, 2000.

Maffei, Massimoe., "Plant volatiles: Production, function and pharmacology", Nat. Prod. Rep., 2011, 28, 1359, https://pubmed.ncbi.nlm.nih.gov/21670801/, Epub Jun. 13, 2011.

Meder, et al., "Multisource energy conversion in plants with soft epicuticular coatings", Energy Environ. Sci., 2022, 15, 2545.

Mishra, et al., "Plant acoustics: in the search of a sound mechanism for sound signaling in plants", Journal of Experimental Botany, vol. 67, No. 15 pp. 4483-4494, doi:10.1093/jxb/erw235, 2016.

Mwesigwa, et al., "Electrochemical signaling in green plants: effects of 2,4-dinitrophenol on variation and action potentials in soybean", Bioelectrochemistry, 51, 201-205, https://www.sciencedirect.com/science/article/abs/pii/S0302459800000751, Jun. 2000.

Mylo, et al., "Conjoining Trees for the Provision of Living Architecture in Future Cities: A Long-Term Inosculation Study", Plants 2023, 12, 1385. https://doi.org/10.3390/plants12061385, Published: Mar. 20, 2023.

Najdenovska, et al., "Classification of Plant Electrophysiology Signals for Detection of Spider Mites Infestation in Tomatoes", Appl. Sci. 2021, 11, 1414, https://doi.org/10.3390/app11041414.

Nishizaki, Yuichiro, "Blue Light Pulse-Induced Transient Changes of Electric Potential and Turgor Pressure in the Motor Cells of *Phaseolus vulgaris* L.", Plant Cell Physiol. 29(6): 1041-1046 (1988), https://doi.org/10.1093/oxfordjournals.pcp.a077585.

Parise, et al., "Detection of Different Hosts From a Distance Alters the Behaviour and Bioelectrical Activity of Cuscuta racemosa", Frontiers in Plant Science, Mar. 2021, vol. 12, Article 594195, https://doi.org/10.3389/fpls.2021.594195.

Reissig, et al., "Fruit Herbivory Alters Plant Electrome: Evidence for Fruit-Shoot Long-Distance Electrical Signaling in Tomato Plants", Frontiers in Sustainable Food Systems, Jul. 2021, vol. 5, Article 657401, https://doi.org/10.3389/fsufs.2021.657401.

Renzaglia, et al., "Morphology supports the setaphyte hypothesis: mosses plus liverworts form a natural group", Bry. Div. Evo. 40 (2): 011-017, https://doi.org/10.11646/bde.40.2.1, published: Dec. 27, 2018.

Rhodes, et al., "Signals and Signalling Pathways", Communication in Plants, F. Baluška, S. Mancuso, D. Volkmann (Eds.) Springer-Verlag Berlin Heidelberg, 2006, Chapter 26, pp. 391-401.

Ríos-Rojas, et al., "Electrophysiological assessment of water stress in fruit-bearing woody plants", Journal of Plant Physiology 171 (2014) 799-806, http://dx.doi.org/10.1016/j.jplph.2014.02.005.

Roblin, G., "Analysis of the Variation Potential Induced by Wounding in Plants", Plant Cell Physiol. 26(3): 455-461 (1985).

Shvetsova, et al., "Soybean electrophysiology: effects of acid rain", Plant Science vol. 162, Issue 5, May 1, 2002, pp. 723-731, https://doi.org/10.1016/S0168-9452(02)00013-4.

Sibaoka, Takao, "Transmission of Action Potentials in Biophytum", Bot. Mag. Tokyo 86: 51-61, 1973, https://doi.org/10.1007/BF02488515.

Sinyukhin, et al., "Action Potentials in the Reproductive System of Plants", Nature, vol. 215, Sep. 16, 1967.

Song, et al., "Interplant Communication of Tomato Plants through Underground Common Mycorrhizal Networks", PLoS One 5(10): e13324. doi:10.1371/journal.pone.0013324, Published Oct. 13, 2010.

Sugimoto, et al., "Uptake and Conversion of Volatile Compounds in Plant-Plant Communication", Deciphering Chemical Language of Plant Communication, Signaling and Communication in Plants, Chapter 13, Springer International Publishing Switzerland 2016, J.D. Blande, R. Glinwood (eds.), DOI 10. 1007/978-3-319-33498-1_13, (2016).

Szechynska-Hebda, et al., "Aboveground plant-to-plant electrical signaling mediates network acquired acclimation", The Plant Cell, 2022, 34: 3047-3065, https://doi.org/10.1093/plcell/koac150.

Telewski, Frankw., "A Unified Hypothesis of Mechanoperception in Plants", American Journal of Botany 93(10): 1466-1476. 2006.

Thomas, et al., "Building bridges: mycelium-mediated plant-plant electrophysiological communication", Plant Signaling & Behavior, 17:1, 2129291, DOI: 10.1080/15592324.2022.2129291, Published online: Nov. 17, 2022.

Tran, et al., "Early Diagnosis of Iron Deficiency in Commercial Tomato Crop Using Electrical Signals", Front. Sustain. Food Syst. vol. 5, Article 631529, doi: 10.3389/fsufs.2021.631529, Feb. 2021.

Tran, et al., "Electrophysiological assessment of plant status outside a Faraday cage using supervised machine learning", Scientific Reports, (2019) 9:17073, https://doi.org/10.1038/s41598-019-53675-4.

Van Sambeek, et al., "Mediation of rapid electrical, metabolic, transpirational, and photosynthetic changes by factors released from wounds. I. Variation potentials and putative action potentials in intact plants", Canadian Journal of Botany, Dec. 1976, https://doi.org/10.1139/b76-284.

Vanden Driessche, Therese, "Nutations in Shoots and in Desmodium Lateral Leaflets, Nyctinastism and Seismonastism in Mimosa pudica. Comparison and Evolution of Morphology and Mechanism", Biological Rhythm Research, 31:4, 451-468, http://dx.doi.org/10.1076/0929-1016(200010)31:4;1-2;FT451, Published online: Aug. 9, 2010.

Volkov, et al., "Bioelectrochemical signaling in green plants induced by photosensory systems", Bioelectrochemistry 63 (2004) 91-94.

Volkov, et al., "Electrical signal propagation within and between tomato plants", Bioelectrochemistry 124 (2018) 195-205, https://doi.org/10.1016/j.bioelechem.2018.08.001.

(56) References Cited

OTHER PUBLICATIONS

Volkov, et al., "Electrotonic signal transduction between Aloe vera plants using underground pathways in soil: Experimental and analytical study", AIMS Biophysics, 4(4): 576-595, DOI: 10.3934/biophy.2017.4.576, Oct. 17, 2017.

Volkov, et al., "Insect-induced bioelectrochemical signals in potato plants", Bioelectrochemistry and Bioenergetics 37 (1995) 55-60.

Volkov, Alexanderg. , "Plant Electrophysiology, Signaling and Responses", Editor Alexander G. Volkov Department of Chemistry Oakwood University Adventist Blvd. 7000 Huntsville, AL 35896, USA, ISBN 978-3-642-29109-8 2012.

Volkov, et al., "Plant electrophysiology: pentachlorophenol induces fast action potentials in soybean", Plant Science 153 (2000) 185-190.

Yu, et al., "Can Electrophysiological Parameters Substitute for Growth, and Photosynthetic Parameters to Characterize the Response of Mulberry and Paper Mulberry to Drought?", Plants 2021, 10, 1772, https://doi.org/10.3390/plants10091772.

Zebelo, et al., "Plasma membrane potential depolarization and cytosolic calcium flux are early events involved in tomato (*Solanum lycopersicon*) plant-to-plant communication", Plant Science 196 (2012) 93-100,http://dx.doi.org/10.1016/j.plantsci.2012.08.006.

\* cited by examiner

SYSTEM AND METHOD FOR SENSING PLANT ELECTRICAL SIGNALS

CROSS-REFERENCE TO RELATED APPLICATIONS

This application claims the benefit of U.S. Provisional Application No. 63/698,154 filed 24 Sep. 2024, which is incorporated in its entirety by this reference.

TECHNICAL FIELD

This invention relates generally to the plant sensing field, and more specifically to a new and useful system and method in the plant sensing field.

DETAILED DESCRIPTION OF THE INVENTION

The following description of the embodiments of the invention is not intended to limit the invention to these embodiments, but rather to enable any person skilled in the art to make and use this invention.

1. Overview

Figure 1:
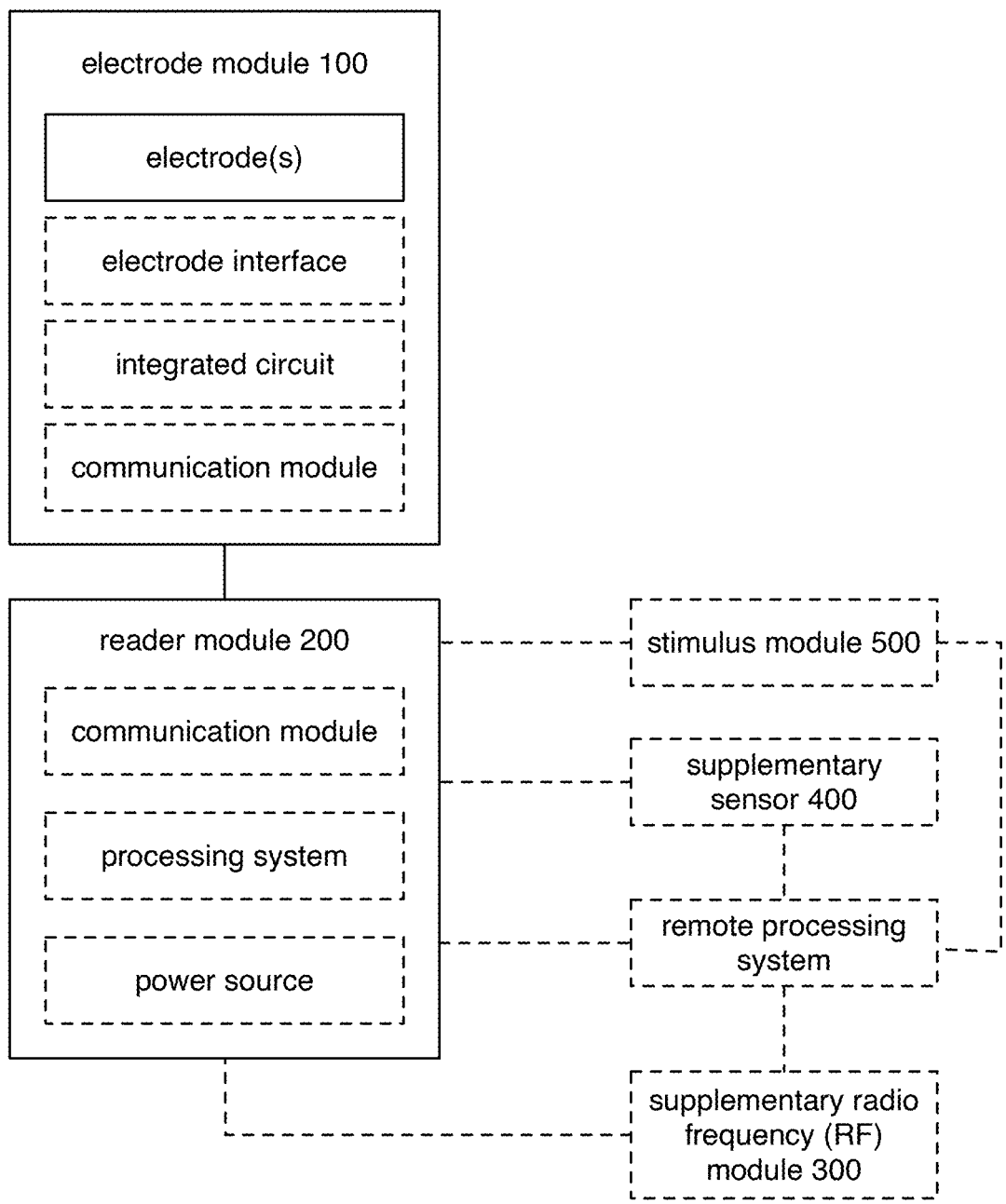
FIG. 1 is a schematic representation of a variant of the system.

As shown in FIG. 1, the system can include: an electrode module 100 and a reader module 200. However, the system can additionally or alternatively include any other suitable components.

In variants, the system can function to record electrical signals from one or more plants, which can be used to evaluate the condition of the plant(s) and/or other elements of the environment. In an example, the system can function as a plant sensor. In a specific example, the electrical signals can be used to detect an environmental parameter, including one or more parameters associated with: the plant from which the electrical signals were recorded (e.g., a stress state of the plant, such as a hydration state), a neighboring plant, a human, an animal, soil, air, water, light, a stimulus, and/or any other element of the environment of the plant.

2. Examples

In an example, the system can include one or more electrode modules, where each electrode module records electrical signals (e.g., biosignals) from a plant. In a specific example, each electrode module can be a wireless module that includes: a pair of electrodes embedded within the plant tissue and a radio frequency identification (RFID) tag (e.g., an integrated circuit and an antenna). In this example, the system can include a reader module that includes a power source, a local processing system, and one or more antennas (e.g., RFID reader antennas) coupled to the plant pot (e.g., in a horizontal plane inside the plant pot, embedded within the plant pot walls, and/or atop the rim of the plant pot). Pairings between individual electrode modules and antennas can optionally be achieved via spatial matching and/or via wavelength matching. In a first specific example, multiple electrode modules can be implanted at different positions (e.g., different heights and/or within different quadrants of the plant's horizontal cross section) along the plant stem, where each electrode module is configured to transmit and/or receive radio frequency (RF) signals at a unique wavelength that corresponds to an antenna of the reader module. In another specific example, the electrode module can be within a quadrant of the plant's horizontal cross section that falls within the range of one specific antenna of a set of antennas of the reader module (e.g., where the set of antennas are arranged around the circumference of the plant pot). The recorded electrical signals can optionally be used to determine an environmental parameter (e.g., a plant stress state and/or an external environmental parameter).

The plant can optionally be used to harvest RF energy (e.g., to power the local subsystem), collect RF signals (e.g., sensing user devices), and/or transmit RF signals. For example, the plant's natural structure and conductive tissues can function as an antenna to collect ambient RF energy as electrical current via the electrodes. In a specific example, the system can switch between using electrode(s) as biosignal sensors and using the electrode(s) as RF energy conduits.

However, the system and/or method can be otherwise performed.

3. Technical Advantages

Variants of the technology can confer one or more advantages over conventional technologies.

First, electrical signals (e.g., biosignals) in plants can be challenging to measure due to the difficulty of maintaining a stable interface between the electrode and the plant tissue without damaging the plant. Variants of the technology can provide a robust interface between electrodes and plant tissue with minimal tissue damage at the recording site, enhancing the quality and reliability of the recorded signals. In a first example, a pair of electrodes can be inserted into the plant tissue and connected to RFID tag components (e.g., an antenna and an integrated circuit). In a specific example, this configuration can enable wireless power and communication, which can protect against wires pulling on the plant and damaging the plant at the electrode-plant interface and/or can provide a more aesthetic appearance. Additionally or alternatively, the RFID tag components can be light-weight (e.g., less than 10 g, less than 5 g, less than 2 g, less than 1 g, etc.), which can further reduce the stress at the electrode-plant interface. In a second example, electrodes can be inserted through the plant tissue and bent to pierce the plant again. In a specific example, this electrode configuration can securely attach the electrode to the plant while minimizing scar tissue at the tip of the electrode, thus increasing the quality of the recorded electric signals. In a third example, the interface between the electrode and the plant can accommodate plant growth (e.g., lateral, secondary growth). The plant's secondary growth can optionally push the electrode laterally outwards, which can ensure the electrode is always in contact with the outermost layers of plant tissue (e.g., which conduct electrical signals). In a first specific example, the interface can accommodate plant growth by having a sufficiently high surface area contact between the electrode and the outer wall of the plant. This can increase the amount of force that the plant's secondary growth can exert on the electrode. In a second specific example, the interface can accommodate plant growth by having sufficiently small friction between the electrode and the plant tissue. This can decrease the amount of force needed by the plant's secondary growth to push the electrode laterally outward.

In a fourth example, magnetic couplings between the electrodes and wires can protect against wires pulling on the plant, reducing stress at the electrode insertion site.

Second, variants of the technology can incorporate a coil in or on a plant pot (e.g., where the coil encircles the base of the plant) to function as an antenna of an RFID reader, wirelessly receiving data from a pair of electrodes on the plant coupled to a corresponding antenna. In an example, multiple antennas can be coupled to the plant pot, where each antenna reads from a distinct electrode module that includes a pair of electrodes (e.g., based on either a specific shared wavelength between an antenna and an electrode module and/or based on a specific electrode module being within range of the corresponding antenna). In a specific example, as the plant pot size increases, the diameter of the antenna loops increase, which can in turn increase the range of the antenna (e.g., such that the range can increase with plant size).

Third, variants of the technology can use the plant as an antenna to collect radio frequency (RF) energy and/or to transmit RF signals. In examples, this can provide power to the system (reducing the system's reliance on external power sources), enable collection of supplemental data, and/or enable transmission of data.

However, further advantages can be provided by the system and method disclosed herein.

3. System

As shown in FIG. 1, the system can include: an electrode module 100 and a reader module 200. The system can optionally include a supplementary radio frequency (RF) module 300, a supplementary sensor 400, a stimulus module 50o, a processing system 600, a pot, a database (e.g., a system database, a third-party database, etc.), a user interface, a user device, and/or any other suitable components.

Figure 2A:
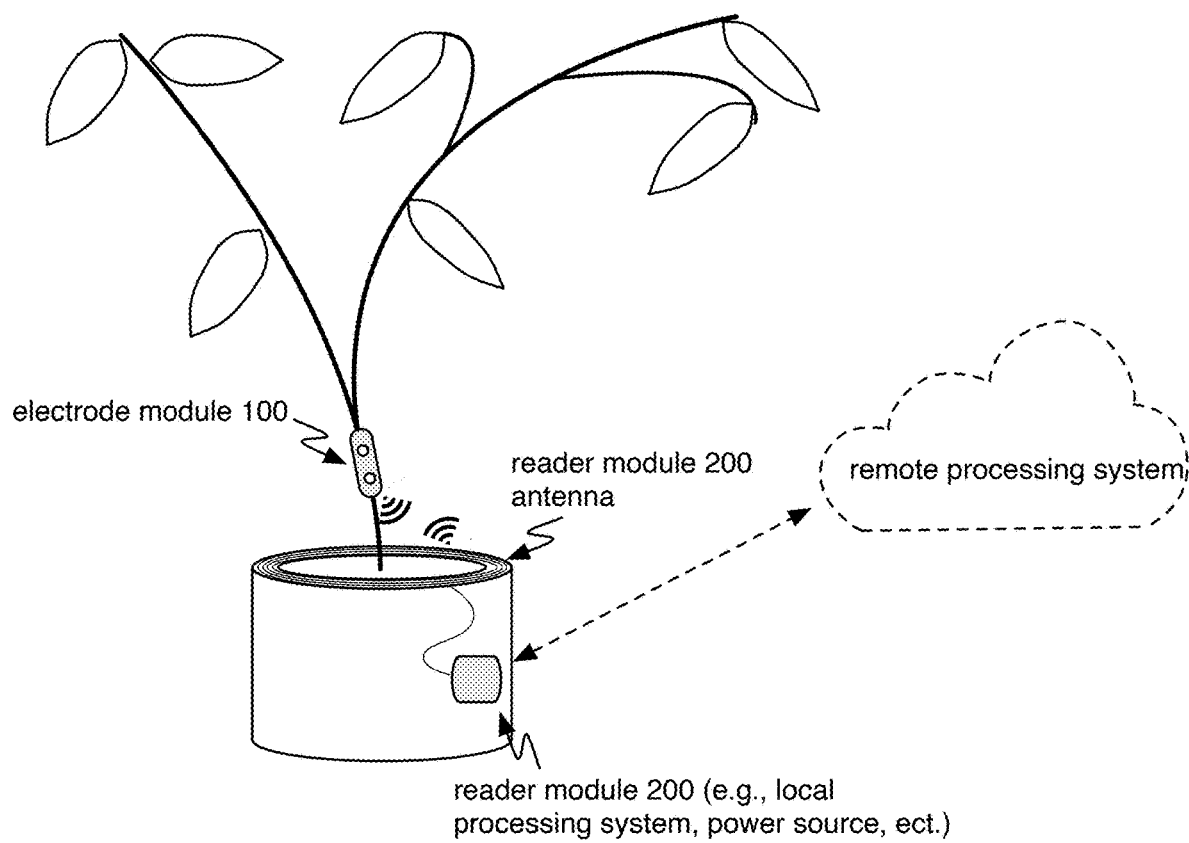
FIG. 2A depicts an example of the system, including a single electrode module.
Figure 2B:
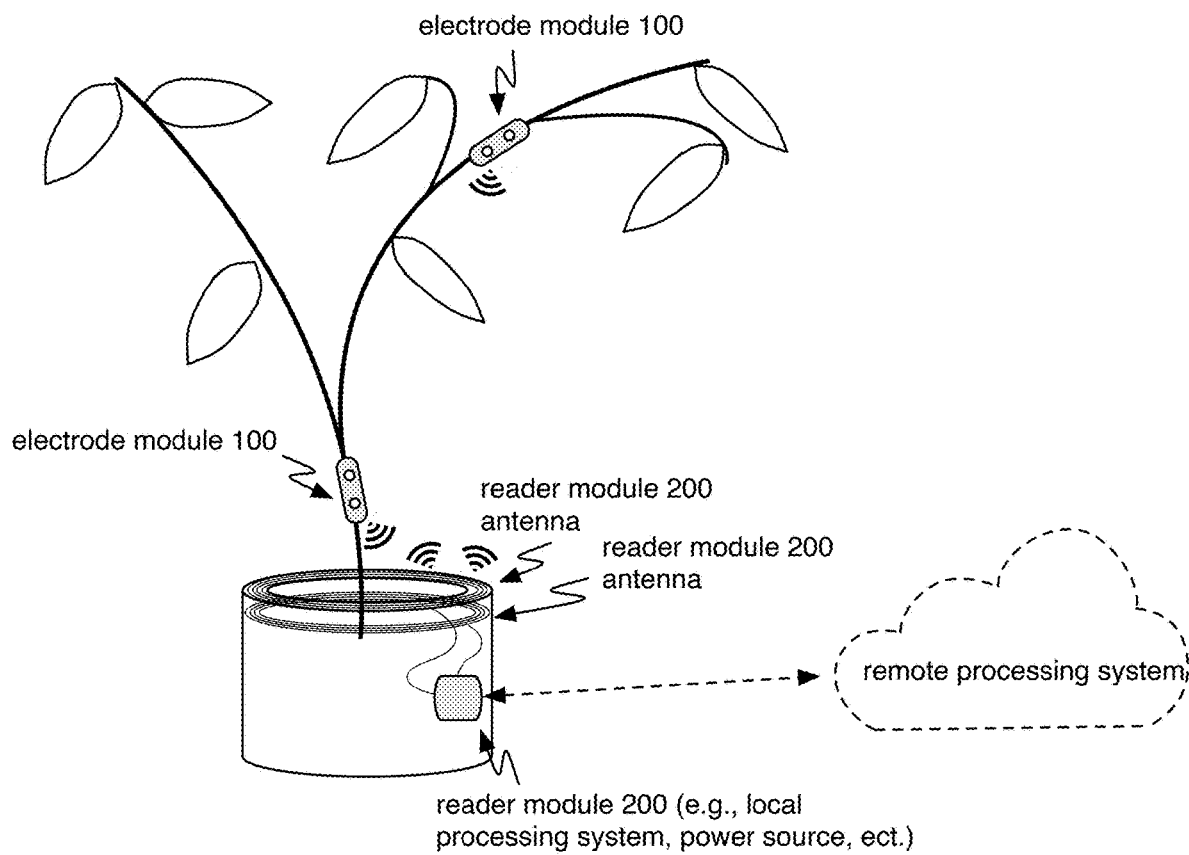
FIG. 2B depicts an example of the system, including multiple electrode modules.
Figure 2C:
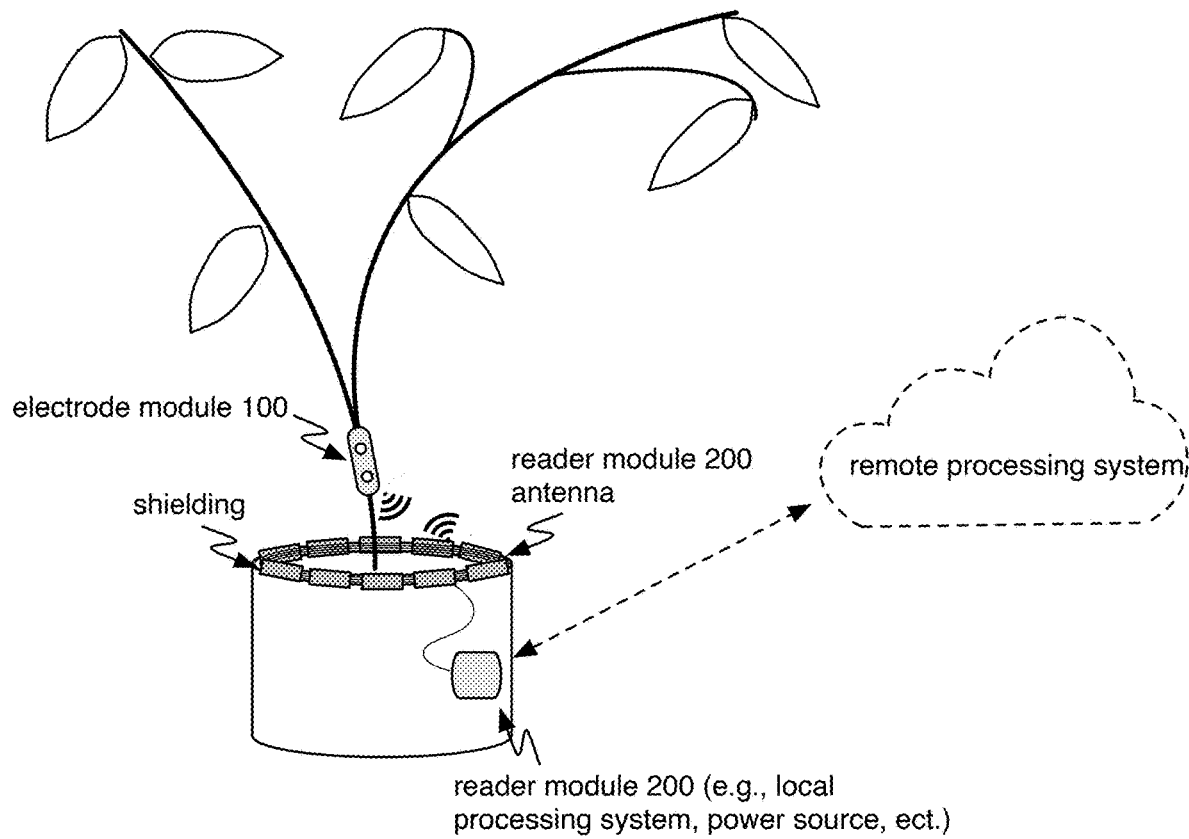
FIG. 2C depicts an example of the system, including shielding.
Figure 2D:
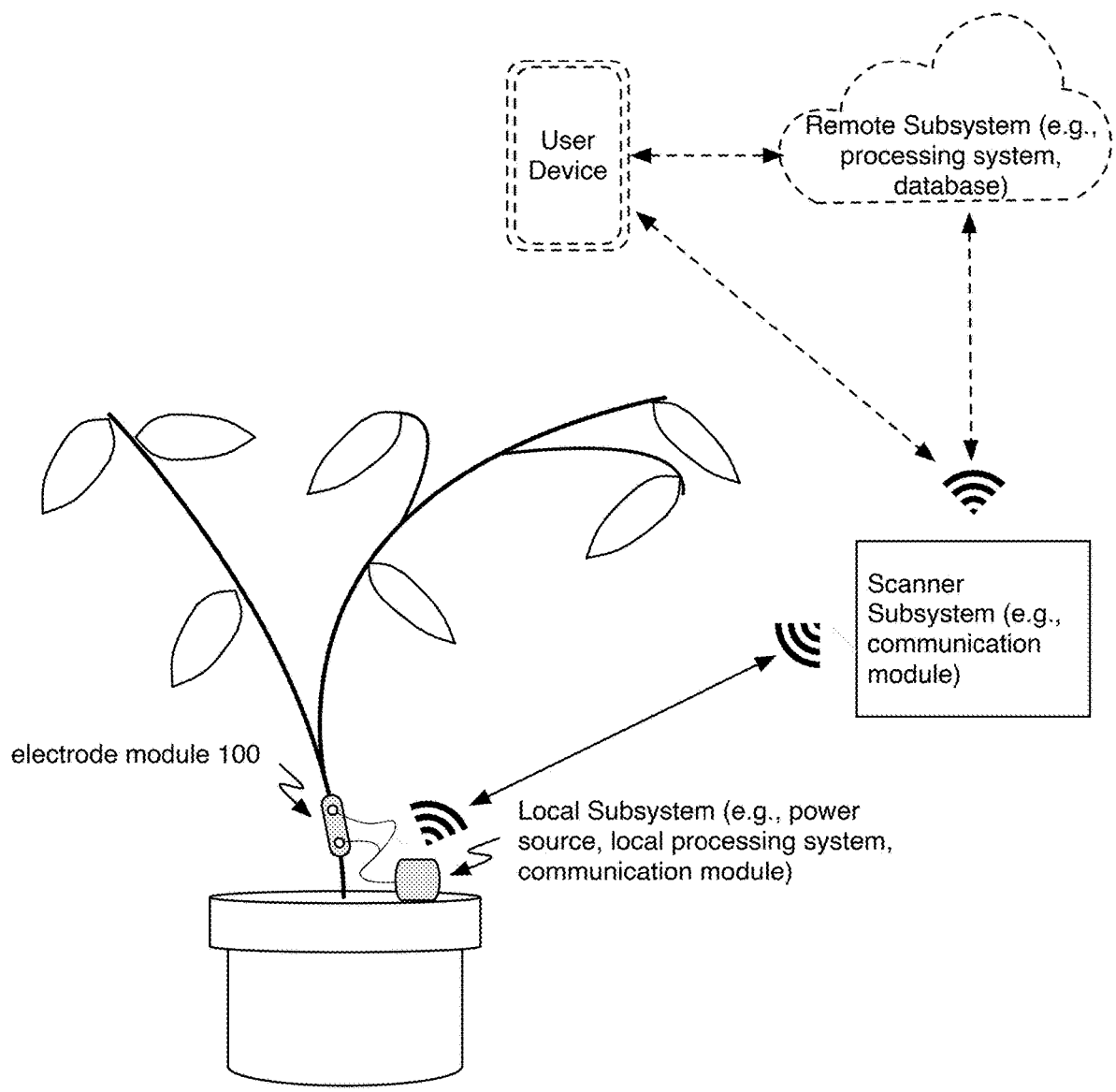
FIGS. 2D-2E depict examples of subsystems.
Figure 2E:
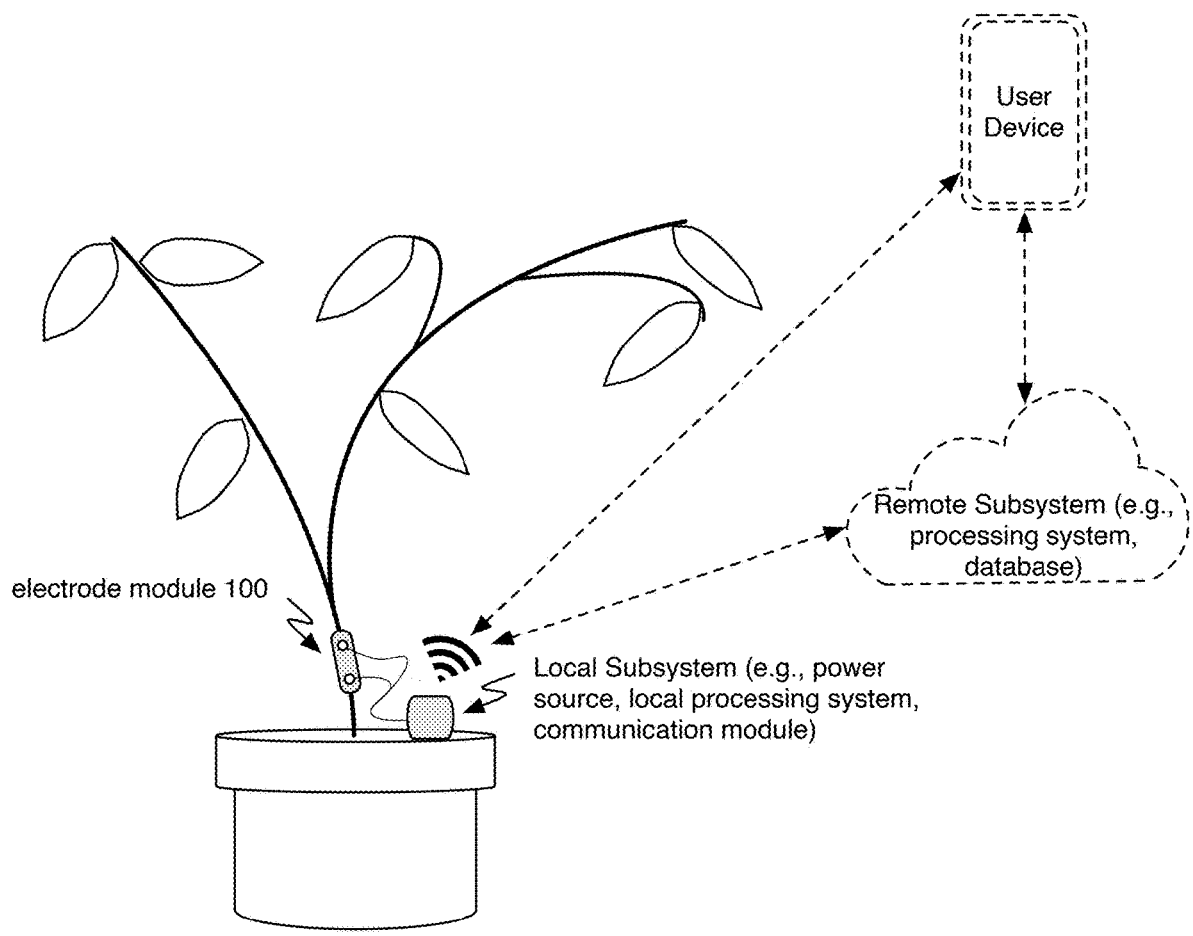
Figure 5A:
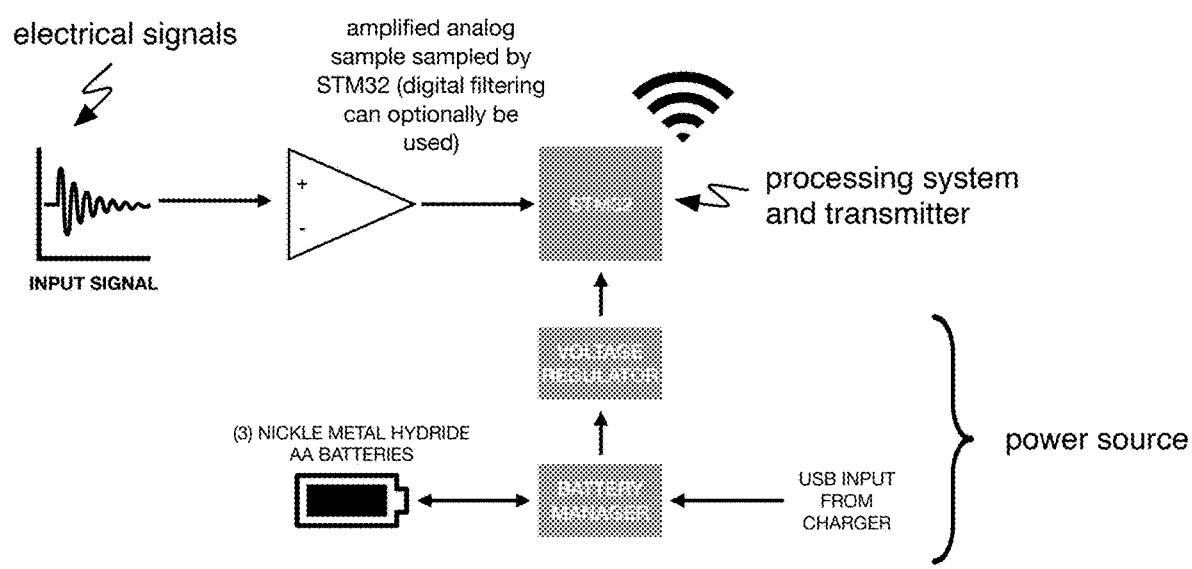
FIGS. 5A-5B depict schematic representations of examples of a local subsystem.
Figure 5B:
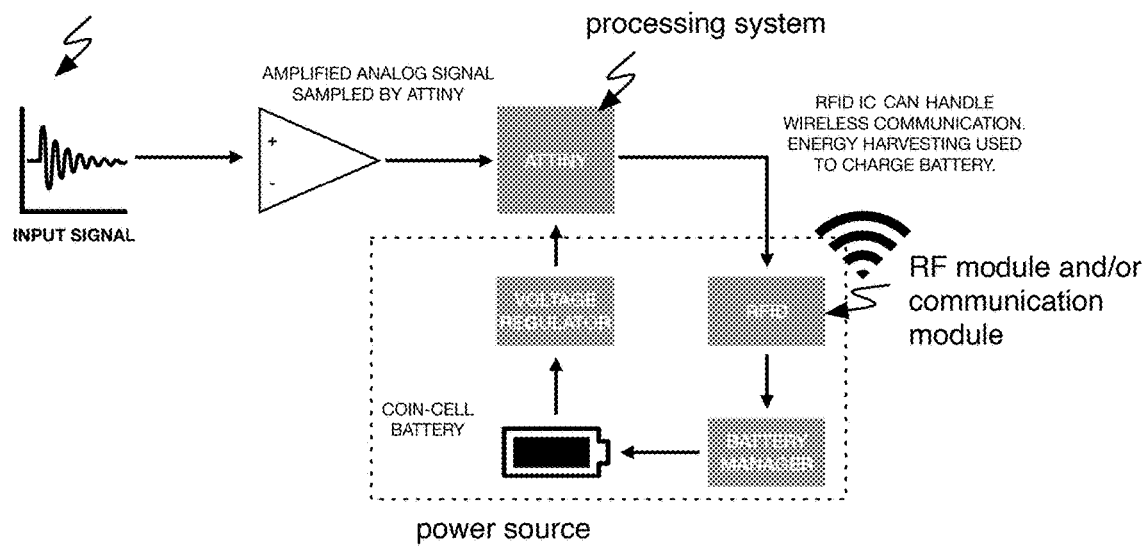
Figure 6A:
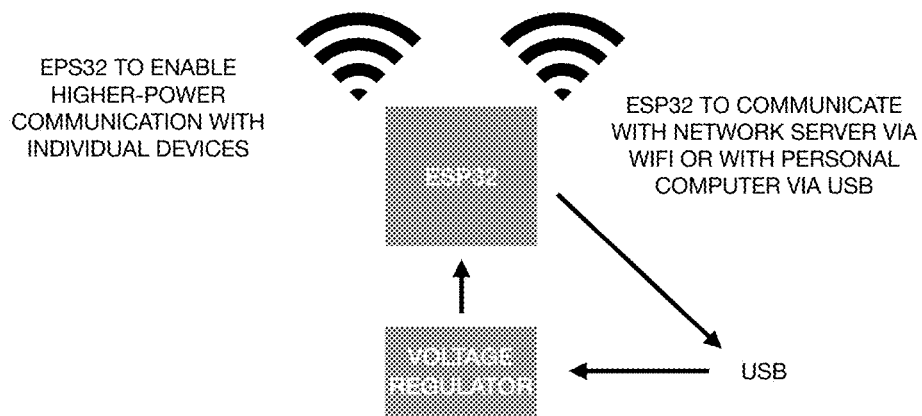
FIGS. 6A-6B depict schematic representations of examples of a scanner subsystem.
Figure 6B:
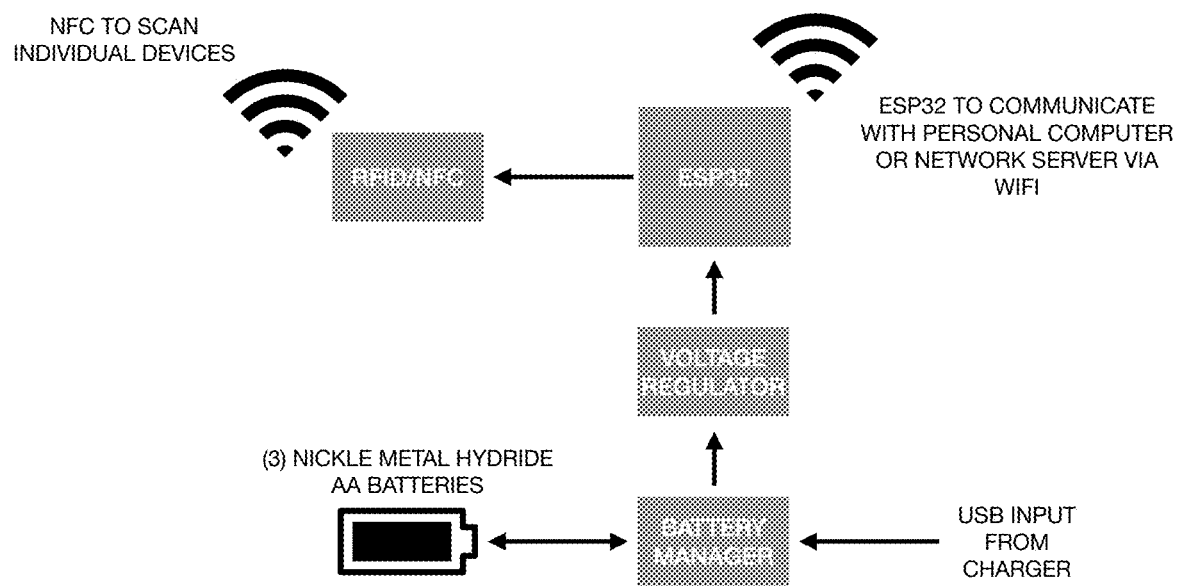
Figure 7A:
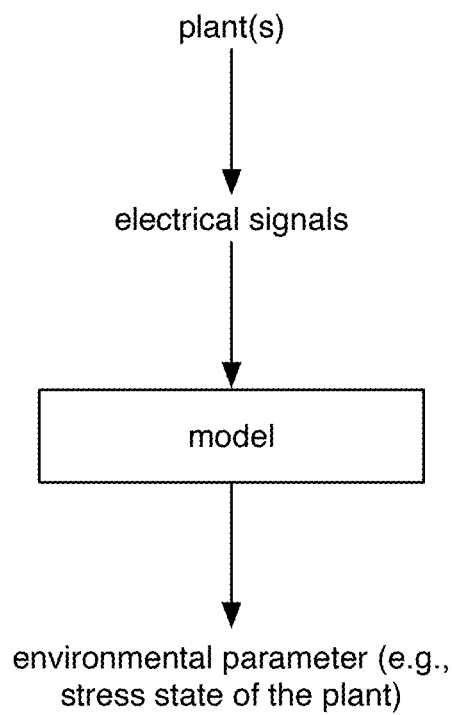
FIG. 7A depicts an example of using electrical signals to determine an environmental parameter (e.g., a stress state of the plant).
Figure 7B:
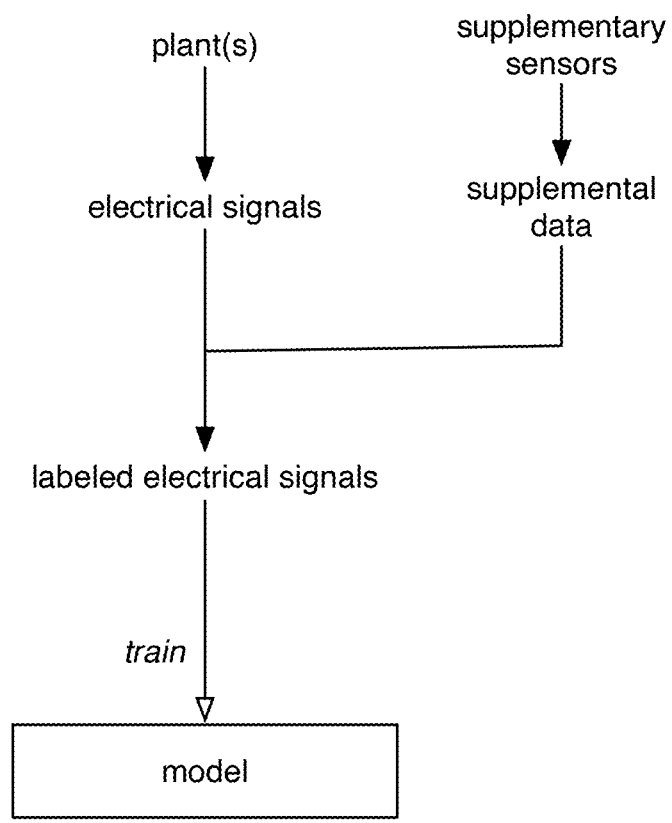
FIG. 7B depicts an example of using electrical signals and supplemental data to train a model.
Figure 8A:
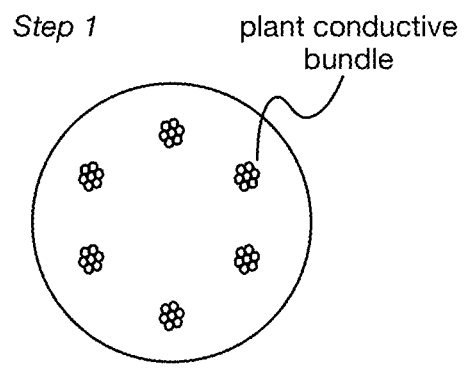
FIGS. 8A-8D depict steps of installing a specific example of an electrode module.
Figure 8B:
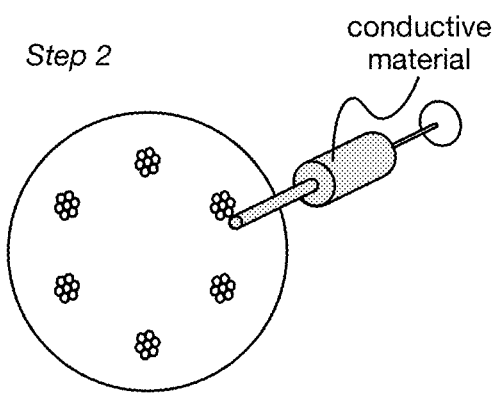
Figure 8C:
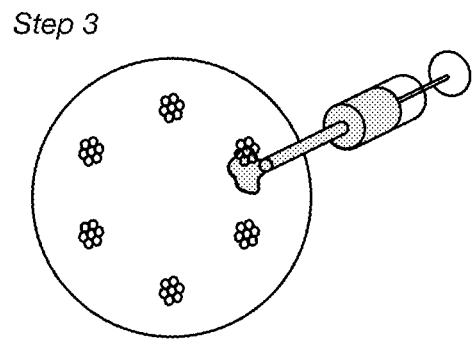
Figure 8D:
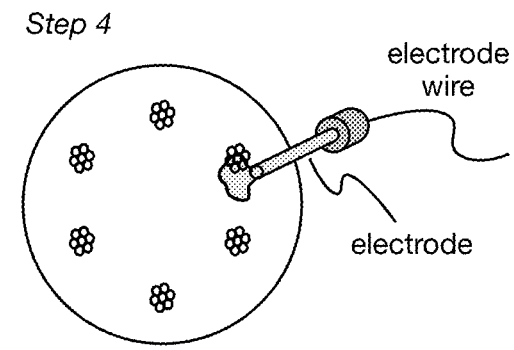

The system can optionally include one or more subsystems. Examples are shown in FIG. 2C and FIG. 2D. For example, the system can include a local subsystem connected to a plant and/or plant pot (e.g., examples shown in FIGURE 5A and FIG. 5B), a scanner subsystem near the plant (e.g., examples shown in FIG. 6A and FIG. 6B), a remote subsystem, a user device, a user interface, and/or any other subsystems. In an example, a local subsystem can include an electrode module 100 and a reader module 200. In an example, a scanner subsystem can include one or more of: a communication module (e.g., a receiver and/or transmitter), a power source, a processing system, and/or any other system components. The scanner subsystem can optionally interface with (e.g., receive electrical signals or other information from) multiple local subsystems (e.g., at least two local subsystems). The scanner subsystem can be stationary, portable, actuated, and/or otherwise configured. In an example, a remote subsystem can include a processing system (e.g., a remote processing system), a cloud database, and/or any other system components. In an example, a user interface can receive one or more inputs (e.g., from a user), display one or more outputs (e.g., one or more environmental parameters, electrical signals, etc.), display any other parameters, and/or otherwise function.

The system can be used with one or more plants. A plant can be located indoors or outdoors. In illustrative examples, a plant can include a houseplant, crop, tree, algae, moss, flowering plant, non-flowering plant, fern, tissue cultures, and/or any other plant. In a specific example, the plant is a fleshy-stemmed plant (e.g., a herbaceous plant). In another specific example, the plant is a woody stemmed plant. As used herein, "plants" can also refer to fungi, algae, lichens, tissue cultures, and/or any other organism. The one or more plants can include plants of the same species or a combination of different species.

The system can optionally include and/or be used with one or more pots. A pot can optionally house and/or be coupled to one or more system components. In a specific example, the pot can house and/or be coupled to all or a portion fo the the reader module 200. One or more plants can optionally be positioned within a pot (e.g., within soil in the pot).

The electrode module 100 functions to collect electrical signals from a plant. The electrical signals can be plant biosignals, signals collected from RF energy (e.g., ambient RF energy, RF signals, etc.), signals from the soil, other environmental signals, and/or any other signals. The electrode module 100 can be connected to the reader module 200 (e.g., wirelessly and/or via a wired connection) and/or connected to any other system component.

The electrode module 100 can include one or more electrodes. The electrode module 100 can optionally include: one or more electrode interfaces, an integrated circuit, a communication module, and/or any other system components. In an example, the electrode module 100 includes a Radio Frequency Identification (RFID) tag and/or components therein. The RFID tag is preferably a passive RFID tag, but can alternatively be an active RFID tag. For example, the electrode module 100 can record an electrical signal from one or more electrodes (e.g., a differential signal from two electrodes) and transmit the electrical signal and/or information therein to the reader module 200 via a passive RFID tag.

The system can include a set of electrode modules. The number of electrode modules 100 in the set of electrode modules can be: 1, 2, 3, 4, 5, 2-10, at least 2, at least 5, at least 10, at least 20, at least 50, at least 100, and/or any other number of electrode modules 100. In a first variant, the system includes a single electrode module 100 that interfaces with a single plant. In a second variant, the system includes a set of electrode modules that interface with a set of plants, where one or more electrode modules 100 interface with each plant in the set of plants. In a first example of the second variant, a single electrode module 100 interfaces with each plant in the set of plants. In a second example of the second variant, two or more electrode modules 100 interface with each plant in the set of plants.

The electrode module 100 can include one or more electrodes, which function to deliver electrical signals to and/or collect electrical signals from the plant (e.g., plant tissue), the soil, and/or any other environment site. Electrode material can include: a conductive metal (e.g., steel, stainless steel, silver, silver chloride, platinum iridium, etc.), conductive gel (e.g., poly(3,4-ethylenedioxythiophene) polystyrene sulfonate (PEDOT:PSS)), and/or any other conductive material. In a specific example, a stainless steel electrode can reduce degradation of the electrode. An electrode can optionally include a wire. The diameter of the wire can be between 0.1 mm-20 mm or any range or value therebetween (e.g., 0.2 mm-1 mm), but can alternatively be less than 0.1 mm or greater than 20 mm. All or portions of the electrodes can optionally be insulated (e.g., using a coating, a cap, etc.). In an example, insulating a portion of an electrode that is exposed outside of the plant can reduce noise in the electrical signals and/or otherwise improve the quality of the recorded electrical signals.

The electrode module 100 can include between 1-50 electrodes or any range or value therebetween (e.g., 1, 2, 3, 4, 5, 1-10, at least 2, etc.), but can alternatively include greater than 50 electrodes. Electrodes can be configured as a recording electrode (e.g., collecting an electrical signal corresponding to a biosignal, RF energy, etc.), a reference electrode (e.g., a common mode sense electrode), a bias electrode (e.g., to transmit an inverse of common mode noise), a combination thereof, and/or any other configuration. In an example, the electrode module 100 can include one or more recording electrodes (e.g., 1, 2, 3, etc.), one or more reference electrodes (e.g., 1, 2, 3, etc.), and an optional bias electrode. In a specific example, the electrode module 100 can include two electrodes (e.g., a recording electrode and a reference electrode), where the electrode module (e.g., an integrated circuit in the electrode module) records a differential signal from the two electrodes. Electrode configuration can optionally change. In an illustrative example, at a first timepoint, Electrode A can be configured as a recording electrode and Electrode B can be configured as a reference electrode; at a second timepoint Electrode A and Electrode B can be configured as recording electrodes (e.g., collecting signals derived from RF energy).

When the electrode module 100 includes multiple electrodes, the distance between the electrodes in the electrode module 100 (e.g., distance between electrode sites) can be between 1 mm-5 m or any range or value therebetween (e.g., 0.5 cm-5 cm, 1 cm-5 cm, 1 cm-2 cm, 1 cm-1.5 cm, etc.), but can alternatively be less than 1 mm or greater than 5 m. In a first specific example, the distance between a recording electrode and a reference electrode can be between 0.5 cm-5 cm or any range or value therebetween (e.g., 1 cm-5 cm, 1 cm-2 cm, 1 cm-1.5 cm, etc.), but can alternatively be less than 0.5 cm or greater than 5 cm. In a second specific example, the distance between a recording electrode and a bias electrode can be between 5 cm-5 m or any range or value therebetween (e.g., greater than 5 cm, greater than 10 cm, greater than 20 cm, greater than 50 cm, etc.), but can alternatively be less than 5 cm or greater than 5 m.

Each electrode can be placed on or inserted into an electrode site (e.g., implantation location); the electrode site can be a plant component (e.g., stem, leaf, root, etc.), a specific location in or on a plant component, a soil location, and/or any other location of the environment. The electrode site preferably corresponds to a conductive tissue bundle in the plant, but can alternatively not correspond to a conductive tissue bundle. Electrode sites for multiple electrode modules can optionally correspond to different positions (e.g., different heights). For example, electrode sites for multiple electrode modules can optionally correspond to different heights along the plant stem and/or different quadrants of the plant stem's horizontal cross section. In a specific example, the general electrode site can be a trunk of a tree, wherein a conductive bundle in the trunk is identified (e.g., using a sensor such as a capacitive sensor) as the specific electrode site for electrode installation.

The electrode site and/or electrode arrangement (e.g., distance between electrodes, number of electrodes, etc.) can optionally be determined based on the plant species, conductive bundle (e.g., vascular bundle) location and/or geometry, an environmental parameter of interest (e.g., the environmental parameter detected using electrical signals recorded by the electrode module 100), the electrode configuration (e.g., as a bias electrode, reference electrode, recording electrode, etc.), a target type of electrical signal to be acquired at the electrode, and/or any other information. The electrode site and/or electrode arrangement can optionally be determined using a model, randomly determined, predetermined, manually determined, using a set of heuristics, and/or otherwise determined. In a specific example, an electrode used for RF energy harvesting can be located at a central location on the plant body (e.g., near the base of its above-ground stem); however, electrodes used for RF energy harvesting can be otherwise located. When the electrode module 100 includes multiple electrodes, the electrode site for each electrode can be the same across the electrodes (e.g., all electrodes are located on the same plant component, such as a plant stem), different across electrodes (e.g., one electrode is located on the plant stem, one electrode is located on the plant leaf; bias electrodes can be located on a different plant component than recording electrodes; etc.), and/or otherwise configured. In an example, the electrode arrangement can be determined to maximize the likelihood that at least one of the electrodes interfaces with a conductive bundle. In a specific example, a model (e.g., a formula) can be used to calculate the electrode spacing given a known spacing between conductive bundles within the plant species.

When the electrode module 100 includes multiple electrodes, each electrode can optionally have different electrode parameters (e.g., material, type, size, etc.), interface with the plant using different methods (e.g., using different electrode interfaces), interface with the plant at different electrode sites, and/or have other similarities or differences. In an example, differences between electrodes can enable different electrical signals to be acquired (e.g., different signal types, different signal resolutions, etc.) at each electrode.

The electrode module 100 can optionally include an electrode interface which functions to couple one or more electrodes to: the plant, other electrodes, electronic connections (e.g., wires), and/or other components. The electrode interface can optionally couple the electrode to the plant using fasteners (e.g., clamps, screws, wraps, barbs, prongs, etc.), adhesive (e.g., a conductive gel), the electrode itself, and/or any other components. The electrode interface can optionally couple the electrode to an electronic connection (e.g., a wire). In an example, the electrode interface can include a magnetic connection between the electrode and the electronic connection. In a specific example, this can enable the electronic connections to be disconnected with minimal stress to the plant.

Figure 3A:
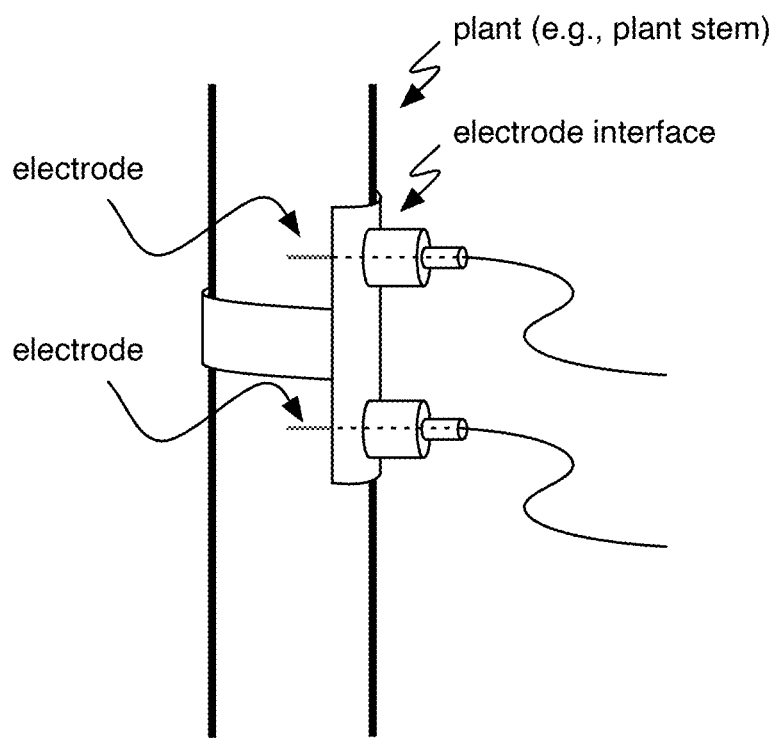
FIGS. 3A-3E depict examples of the electrode module.

The electrode interface can optionally accommodate for growth (e.g., secondary growth and/or primary growth) and/or movement of the plant. The plant's secondary growth can optionally push the electrode laterally outwards, which can ensure the electrode is always in contact with the outermost layers of plant tissue (e.g., which conduct electrical signals). In a first specific example, the interface can accommodate plant growth by having a sufficiently high surface area contact between the electrode and the outer wall of the plant. This can increase the amount of force that the plant's secondary growth can exert on the electrode. In a second specific example, the interface can accommodate plant growth by having sufficiently small friction between the electrode and the plant tissue. This can decrease the amount of force needed by the plant's secondary growth to push the electrode laterally outward. In a first illustrative example, the electrode interface can include a sliding connection (e.g., a bore), wherein the end of the electronic connection (coupled to the electrode) can slide (e.g., within the bore) as the electrode moves away from the electrode interface (e.g., due to secondary growth of the plant); an example is shown in FIG. 3F. In a second illustrative example, the electrode interface can include a smooth shaft interfacing with a bracket (e.g., wherein the bracket can move outward along the shaft as the plant grows).

The electrode(s) and/or electrode interface can optionally include a conductive material (e.g., a conductive gel). The conductive material can optionally be adhesive, hardening, and/or have any other properties. In a specific example, the conductive gel can include PEDOT:PSS.

In a first variant, electrode(s) in the electrode module 100 are inserted into the plant.

In a first example of the first variant, the electrode can be inserted partially through the plant. In an example, the portion of the electrode inserted into the plant can be between 0.5 mm-50 mm or any range or value therebetween (e.g., at least 0.1 mm, at least 1 mm, 1 mm-5 mm, etc.). An example is shown in FIG. 3A.

In a second example of the first variant, the electrode can be inserted completely through the plant. In a specific example, a tip of the electrode can protrude out of the plant (e.g., out of the stem of the plant). In an example, the tip of the electrode that protrudes out of the plant can be between 0 mm-100 mm or any range or value therebetween (e.g., at least 0.1 mm, at least 1 mm, 1 mm-5 mm, etc.). Examples are shown in FIG. 3D and FIG. 3E.

Figure 3B:
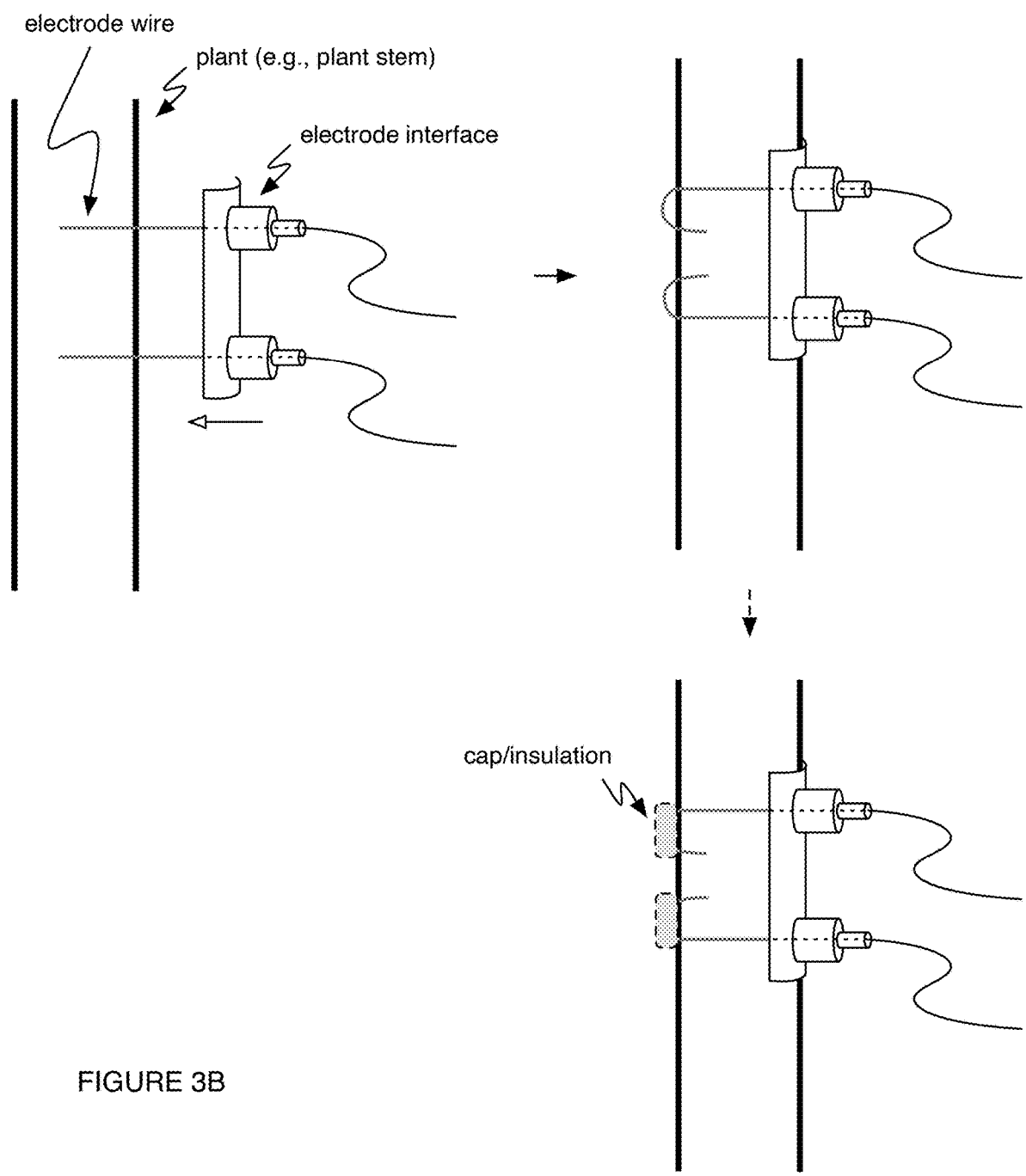
Figure 3C:
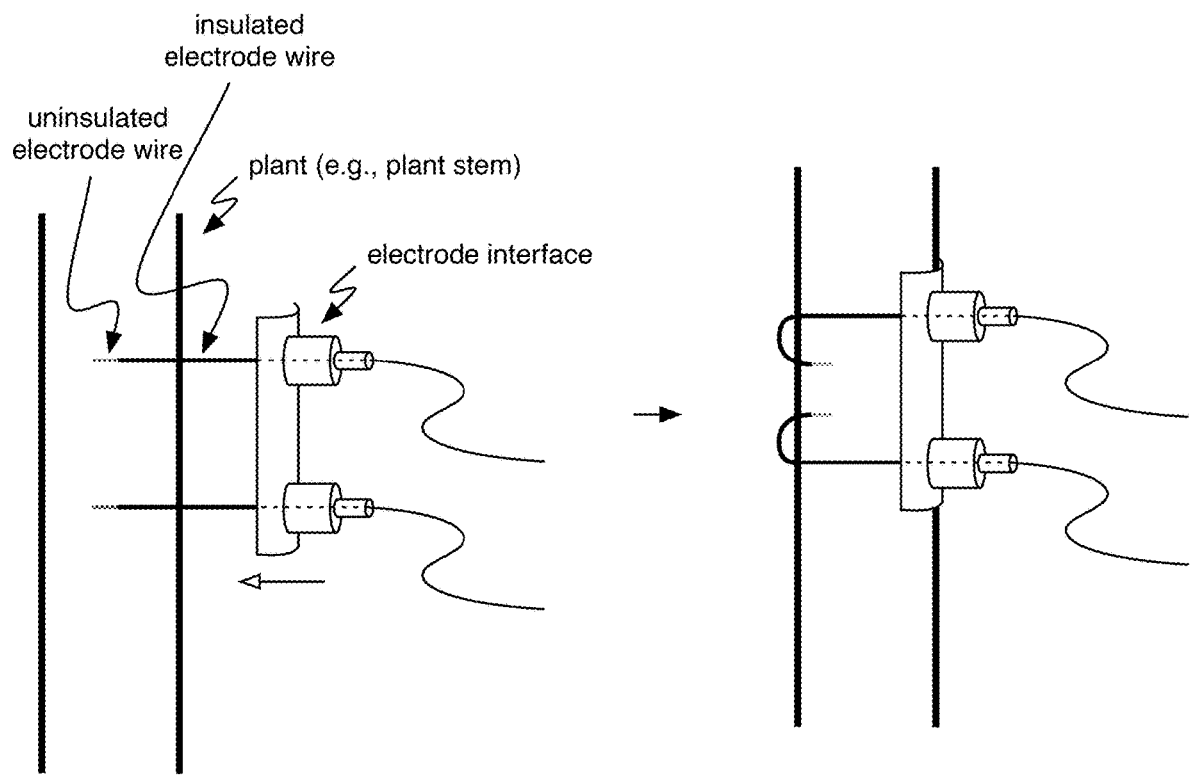
Figure 3D:
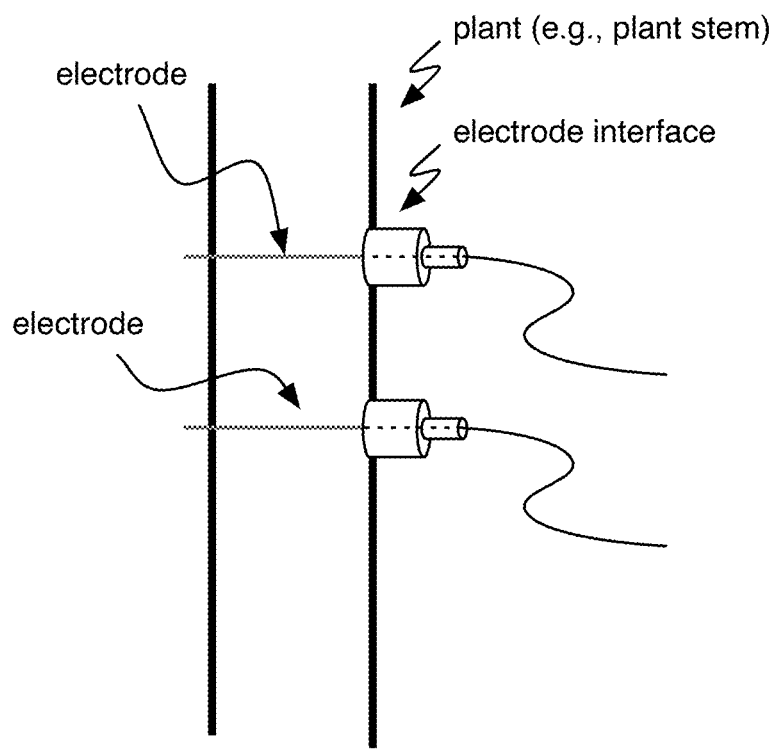
Figure 3E:
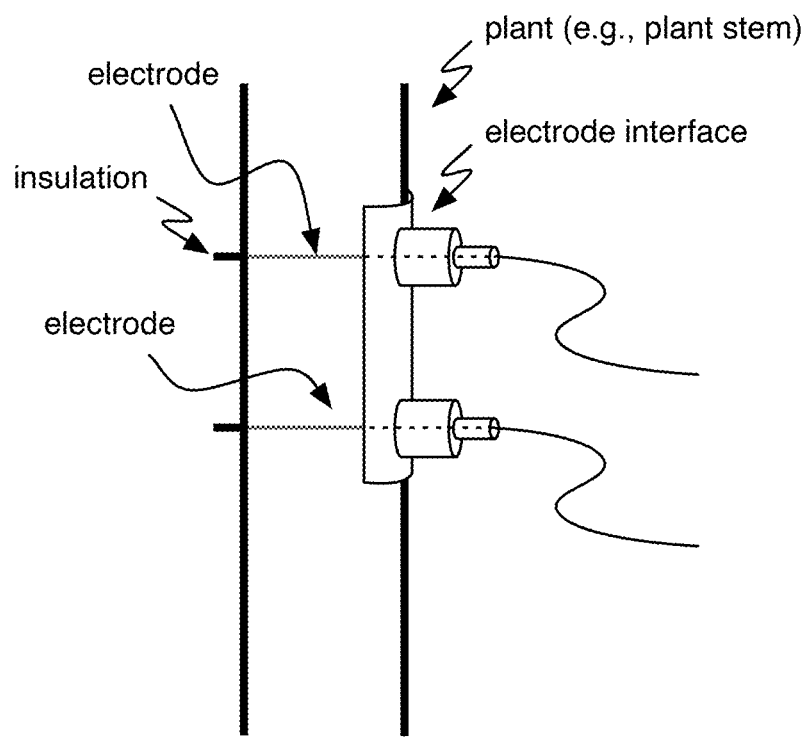
Figure 3F:
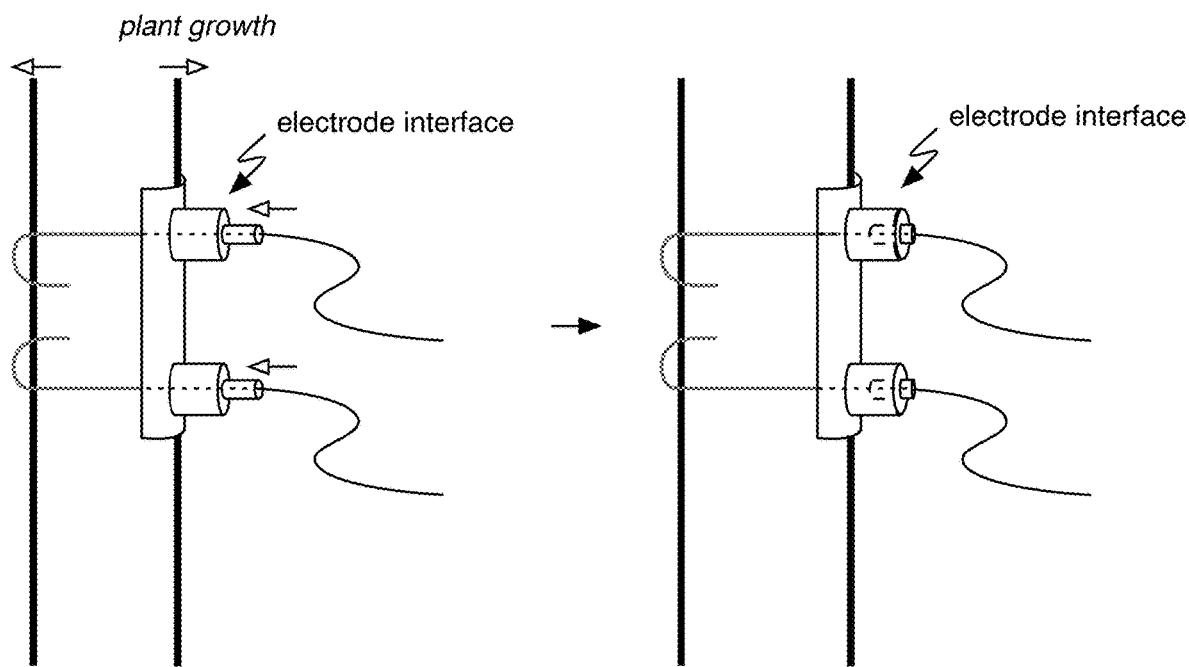
FIG. 3F depicts an example of the electrode module accommodating plant growth.

In a third example of the first variant, the electrode can be inserted through the plant and bent to pierce the plant again (e.g., a stapler mechanism); examples are shown in FIG. 3B and FIG. 3C. The tip of the electrode that protrudes back into the plant tissue (e.g., at a different vertical location) can be between 0 mm-50 mm or any range or value therebetween (e.g., at least 0.1 mm, at least 1 mm, 1 mm-5 mm, etc.). This electrode configuration can optionally reduce the scar tissue and/or other damage to the plant at all or a portion of the plant tissue contacting the electrode (e.g., at the tip of the electrode), which can increase the quality of the recorded electric signals. This electrode configuration can optionally function to securely attach the electrode to the plant. The electrode can optionally be bent in any direction (e.g., towards a neighboring electrode, away from a neighboring electrode, up the plant stem, down the plant stem, etc.). The electrode can be bent manually, using a plate (e.g., with a groove guiding the bending geometry), and/or otherwise bent. The electrode can optionally include a first segment piercing through the plant tissue, a second segment that includes a resistor, and a third segment that is bent back to pierce the plant tissue again (e.g., where the second segment connects the first segment and the third segment). In variants, this electrode configuration that includes a resistor can be useful for detecting directionality of action potential (AP) information flow (e.g, in the case of traveling signals with non-degrading or minimally degrading amplitude) and/or for situations where the number of ADC channels (e.g., on the electrode module 100) is limited. In an illustrative example, because APs can be self-propagating electrical signals that maintain amplitude as they travel, if the electrode first records a high amplitude AP (via the first segment), then a low amplitude AP shortly afterwards (via the third segment), it could be inferred that the AP is traveling past the electrode in a first direction, from the top of the plant towards the bottom of the plant. In another illustrative example, if the electrode first records a low amplitude AP (via the first segment), then a high amplitude AP shortly afterwards (via the third segment), it could be inferred that the AP is traveling past the electrode in a second direction, from the bottom of the plant towards the top of the plant.

In a first embodiment, inserting the electrode into the plant can include pushing the electrode into the plant, piecing the plant tissue. For example, one or more electrodes can be coupled to the electrode interface, wherein the electrode interface is used as a handle to press the electrodes into the plant tissue. In a second embodiment, inserting the electrode into the plant can include creating a (partial- or through-) hole in the plant (e.g., coring the plant using a hollow needle) and inserting the electrode into the hole. Conductive material can optionally be inserted into the hole before, during, and/or after inserting the electrode into the hole. In a third embodiment, inserting the electrode into the plant can include inserting a conductive fluid (e.g., conductive liquid and/or gel such as PEDOT:PSS) into the plant tissue (e.g., after coring the plant or without coring the plant), wherein the electrode includes or interfaces with the conductive fluid. For example, a portion of the conductive fluid (e.g., a bolus of the conductive fluid) can be injected into the plant tissue using a syringe and needle (e.g., detachable needle). In a specific example, the conductive fluid can travel within the intercellular space (e.g., around cells of conductive bundles), making a high surface area conductive interface that is contiguous with the conductive fluid still in the needle. The conductive fluid can optionally harden (e.g., gel) after injection into the plant tissue. In an example, the syringe body can be removed, leaving the needle partially inserted in the plant tissue; an electrical connection (e.g., wire) can be connected to the needle, making the needle an electrode (e.g., with a high surface area interface with the plant's conductive bundles via the ejected conductive fluid). An example is shown in FIG. 8A, FIG. 8B, FIG. 8C, and FIG. 8D.

In a second variant, electrode(s) in the electrode module 100 include a surface electrode touching the plant. In a first example, the electrode can include a conductive material touching the plant surface, wherein the conductive material acts as an adhesive. In a second example, the electrode can include a conductive material touching the plant surface, wherein the electrode is coupled to the plant via the electrode interface. In specific examples, the electrode interface can include a clamp, a wrap (e.g., wrapping around the plant stem or other location), adhesive, prongs inserted into the plant, and/or any other coupling system. In a third example, the electrode can include a conductive material touching the plant surface, wherein the electrode itself can wrap around the plant surface (e.g., to increase contact surface area, to couple the electrode to the plant, etc.). In a fourth example, the electrode can include a substrate of a conductive material, wherein the plant (e.g., moss) can grow on the substrate.

In variants where the plant is or includes a vine, the electrode interface can couple electrode(s) to the vine.

In a first embodiment, electrode(s) can interface with a vine lying near or against the outer surface of the plant pot. This configuration can optionally avoid or lessen visible exposure of electrode module components (e.g., wires, electrodes, communication module, etc.), and/or can make use of the natural proximity of dangling vines to the side of the pot. A light source (e.g., a stimulus module 50o, as described below) can optionally additionally be coupled to the pot (e.g., recessed in the pot surface and/or protruding from the pot surface) to apply a light stimulus to the vine. The electrode(s) and/or wired connection(s) can optionally pass through the plant pot wall. In an example of electrode(s) interfacing with a vine lying near or against the outer surface of the plant pot, the pot can include one or more grooves (e.g., electrode-d grooves) in which one or more vines lay, wherein an electrode can interface with a vine and a base of a groove (e.g., the surface of the groove). The electrodes can optionally serve to anchor the vines in place in the grooves, keeping them from falling out of the grooves. The grooves can optionally provide technical advantages, such as: coupling the pot and/or electrodes to the vines more securely, mitigating the risk of the electrodes poking a user's fingers when handling the pot, and/or enabling a more aesthetic arrangement of the vines. The grooves can optionally be laid out in different patterns (e.g., swirling designs) on the pot's surface.

In a first example, electrodes can protrude from the pot wall (e.g., from the base of the grooves). In a second example, electrodes can be inserted through the vine into holes (e.g., sockets) in the pot wall (e.g., from the base of the grooves). In a third example, electrodes can be inserted into the vine (e.g., partially or completely) and can be magnetically coupled to corresponding magnetic elements on the pot wall (e.g., on the base of the grooves). In a first specific example, an electrode can include a spike segment that inserts into the plant and a base element that magnetically couples to a magnetic element (e.g., a magnetic dock) on the pot wall (e.g., the electrode resembles a tack), where the magnetic element is connected to an integrated circuit of an electrode module 100 (e.g., located within the pot). In a second specific example, an electrode can include a spike segment that inserts into the plant, a base element connected to a first end of the spike segment that magnetically couples to a magnetic element (e.g., a magnetic dock) on the pot wall, and a cap element connected to the other end of the spike segment (e.g., the electrode resembles a tack with a cap), where the magnetic element is connected to an integrated circuit of an electrode module 100 (e.g., located within the pot). In a specific example, the electrode can dangle free with the vine (e.g., not operational) or be magnetically coupled to a magnetic element on the pot to become operational. The use of magnetic elements to connect the electrode to the plant pot can optionally reduce damage to the plant if the vine is tugged.

In a second embodiment, electrode(s) can protrude from a vertical support (e.g., where the vertical support can be coupled to the plant pot or part of the plant pot) and interface with a vine growing on the vertical support. The vertical support can optionally serve to house electronic components (e.g., hiding the components from view), house a light source (e.g., an LED can be embedded within or otherwise coupled to the vertical support, a light pipe can be embedded within the vertical support, the vertical support can function as a light pipe, etc.), and/or provide other functions.

The electrode module 100 can optionally be configured to accommodate different: species of plants, types of plants, plant sizes, plant shapes, points within a plant's growth cycle, plant components (e.g., stem, root, leaf, etc.), plant mechanical properties (e.g., stem hardness), and/or any other plant characteristics. Additionally or alternatively, the electrode module 100 can be configured to be specific to one or more species of plants, types of plants, plant sizes (e.g., a range of stem sizes), plant shapes, points within a plant's growth cycle, plant components, plant mechanical properties, and/or any other plant characteristics. In a first illustrative example, a first electrode module 100 can attach to a first plant component of a plant, and a second electrode module 100 can attach to a second plant component of the same plant. In a second illustrative example, a first electrode module 100 can attach to a first plant, and a second electrode module 100 can attach to a second plant (e.g., of the same species or a different species as the first plant).

The electrode module 100 can optionally include an integrated circuit, which functions to record electrical signals from the one or more electrodes, store electrical signals from the one or more electrodes, receive a signal (e.g., an RF signal) from the reader module 200, and/or transmit a signal (e.g., an RF signal) to the reader module 200 (e.g., via the communication module). In an example, the integrated circuit can record a differential signal from two electrodes (e.g., a recording electrode and a reference electrode) in the electrode module 100. The integrated circuit can optionally include a memory component where the electrical signals (e.g., the recorded differential signal) can be stored. In an example, the integrated circuit can be an RFID tag integrated circuit. The integrated circuit can optionally include or interface with a communication module (e.g., an RFID tag antenna). However, the integrated circuit can be otherwise configured.

The electrode module 100 can optionally include a communication module, which functions to transmit signals to the reader module 200 and/or receive signals from the reader module 200. Data can be transmitted in real time, in batches, when prompted (e.g., by the processing system 600), and/or at any other time. The communication module (e.g., an antenna) can be: located at or near the electrode site of the electrode module 100, coupled to the stem of the plant, coupled to a leaf of the plant, and/or otherwise located. In a first specific example, an antenna can be embedded within a flexible substrate (e.g., "sticker"), which adheres to the surface of a leaf (e.g., a leaf nearby the electrode module 100). In a second specific example, an antenna can be coupled to (e.g., clipped to) the edge of a leaf (e.g., a leaf nearby the electrode module 100).

In a first variant, the communication module of the electrode module 100 includes a wired connection. In a first example, each electrode can be individually connected to the reader module 200 via a wired connection. In a second example, the integrated circuit can be connected to the reader module 200 via a wired connection. The wired connection can optionally include a strain relief component. In a specific example, a grafting clip can be used to couple the wired connection to the plant (e.g., such that the interface between the electrode and the plant is not under stress).

In a second variant, the communication module of the electrode module 100 includes one or more wireless communication elements. Examples of wireless communication elements include: a transmitter, a receiver, a transceiver, an antenna, and/or any other communication elements. In examples, a transmitter can include or use: Bluetooth, WiFi, a wired connection, RF (e.g., RFID tag and/or RFID reader, the supplementary RF module 300, etc.), infrared transmitter, and/or any other communication system. In a specific example, the transmitter can use frequencies between 30 kHz-430 THz or any range or value therebetween (e.g., low frequency (LF) radio frequency, high frequency (HF) radio frequency, ultra high frequency (UHF) radio frequency, any radio frequency, Bluetooth, infrared, etc.). In examples, a receiver can include or use: RF (e.g., RFID tag and/or RFID reader, the supplementary RF module 300, etc.), NFC, Bluetooth, WiFi, a wired connection, infrared receiver, and/or any other communication system.

For example, the communication module of the electrode module 100 can be or include an antenna (e.g., an electrode module antenna). In an example, the communication module can be or include an RFID tag antenna, configured to transmit and receive RF signals. In a specific example, the electrode module 100 includes an RFID tag that can transmit a signal to an RFID reader in the reader module 200 upon receiving a signal (e.g., an activation signal) from the RFID reader. In an example, a first electrode module includes a first antenna configured to transmit a recorded signal (e.g., transmit an RF signal encoding a differential signal recorded by the first electrode module) at a first wavelength to the reader module 200 (e.g., to a first RFID reader in the reader module 200), and a second electrode module includes a second antenna configured to transmit a recorded signal (e.g., transmit an RF signal encoding a differential signal recorded by the second electrode module) at a second wavelength to the reader module 200 (e.g., to a second RFID reader in the reader module 200). In this example, the first electrode module can be coupled to the plant at a first height (e.g., at a first distance from the reader module 200), and the second electrode module can be coupled to the plant at a second height (e.g., at a second distance from the reader module 200), the second height lower than the first height (e.g., the second distance less than the first distance), wherein the first wavelength is longer than the second wavelength. In variants, a longer wavelength can be used for electrode module(s) that are placed further from the RFID reader (e.g., to provide them with a longer communication range).

In a third variant, the communication module of the electrode module 100 can include a receiver associated with an optical communication element (e.g., light source) of the reader module 200. In a first example, the receiver can be an optical receiver (e.g., receiving light as a signal). In a second example, the receiver can be an electrical receiver such as an electrode (e.g., where the optical communication element transmits a light as a stimulus and the plant's electrical response to the light is read via the electrical receiver).

However, the communication module of the electrode module 100 can be otherwise configured.

However, the electrode module 100 can be otherwise configured.

The reader module 200 functions to record the electrical signals collected by one or more electrode modules 100. The reader module 200 can optionally function to: power the one or more electrode modules 100, transmit the electrical signals to a remote processing system, and/or perform any other suitable functions. The reader module 200 can include one or more communication modules, a power source, a processing system (e.g., local processing system), and/or any other system components.

The reader module 200 can optionally include one or more communication modules, which function to transmit signals to one or more electrode modules 100 (e.g., the communication module(s) of the one or more electrode modules 100) and/or receive signals from one or more electrode modules 100 (e.g., from the communication module(s) of the one or more electrode modules 100). The number of communication modules (e.g., antenna) in the reader module 200 can be between 1-100 or any range or value therebetween (e.g., 1-10, at least 2, at least 3, at least 5, etc.), but can alternatively be greater than 100.

In a first variant, the communication module of the reader module 200 includes a wired connection. In an example, the reader module 200 can be connected to an electrode module 100 via a wired connection (e.g., as described above). In a second variant, the communication module of the reader module 200 can include an optical communication element (e.g., light source). For example, a light source can shine a light into the plant body (e.g., sub-soil), using the plant's light-pipe characteristics to carry the light from the light source up through the stem to the tissue at or near the electrode module. In a third variant, the communication module of the reader module 200 includes one or more wireless communication elements (e.g., any wireless communication elements as described for the electrode module 100). For example, a communication module of the reader module 200 can be or include an antenna (e.g., a reader module antenna). In an example, the communication module can be or include all or a portion of an RFID reader, configured to transmit and receive RF signals. For example, the communication module can be or include an RFID reader antenna. In a specific example, the reader module 200 includes an RFID reader that can transmit a signal (e.g., an activation signal, optionally providing power to the RFID tag) to an RFID tag in an electrode module 100.

The reader module 200 can optionally include multiple communication modules (e.g., multiple antennas) for communicating with multiple electrode modules 100. In an example, the reader module 200 can include a first communication module (e.g., a first antenna) configured to communicate with a first electrode module, and a second communication module (e.g., a second antenna) configured to communicate with a second electrode module. Each individual antenna of a reader module 200 can optionally correspond to (e.g., communicate with) an individual electrode module 100. Pairings between antennas and electrode modules 100 can optionally be achieved via spatial matching and/or via wavelength matching. In an example of wavelength matching, the reader module 200 can include a first communication module (e.g., a first antenna) configured to communicate with a first electrode module at a first wavelength, and a second communication module (e.g., a second antenna) configured to communicate with a second electrode module at a second wavelength. In an example of spatial matching, the reader module 200 can include a first communication module (e.g., a first antenna) at a first location and a second communication module (e.g., a second antenna) at a second location, wherein the first communication module is closer to a first electrode module than a second electrode module (e.g., the first electrode module is within range of the first communication module and the second electrode module is not within range of the first communication module), and wherein the second communication module is closer to the second electrode module than the first electrode module (e.g., the second electrode module is within range of the second communication module and the first electrode module is not within range of the second communication module). In a specific example, each communication module can be activated (e.g., iteratively, in series) to scan for RFID tags (e.g., on electrode modules) within its range. If an RFID tag is detected by multiple antennas, the power of its signal, as detected by each antenna, can be compared to triangulate the RFID tag to identify the associated electrode module.

In variants, when the communication module of the reader module 200 includes an antenna, the antenna can optionally encircle the base of the plant (e.g., encircling the lower stem of the plant, encircling roots of the plant, etc.). Examples are shown in FIG. 2A, FIG. 2B, and FIG. 2C. For example, the antenna can contain a set of spiraled loops, where each spiraled loop encircles the base of the plant. The antenna can optionally be configured to have a vertically-focused beam (e.g., to facilitate communication with electrode modules on the plant). The antenna is preferably contained within a horizontal plane (e.g., where each spiraled loop is in the same plane), but can alternatively be oriented such that the spiraled loops stack vertically and/or can be otherwise configured. In a specific example, the antenna of an electrode module 100 can be within a plane orthogonal to the plane of the antenna of a reader module 200.

Figure 9:
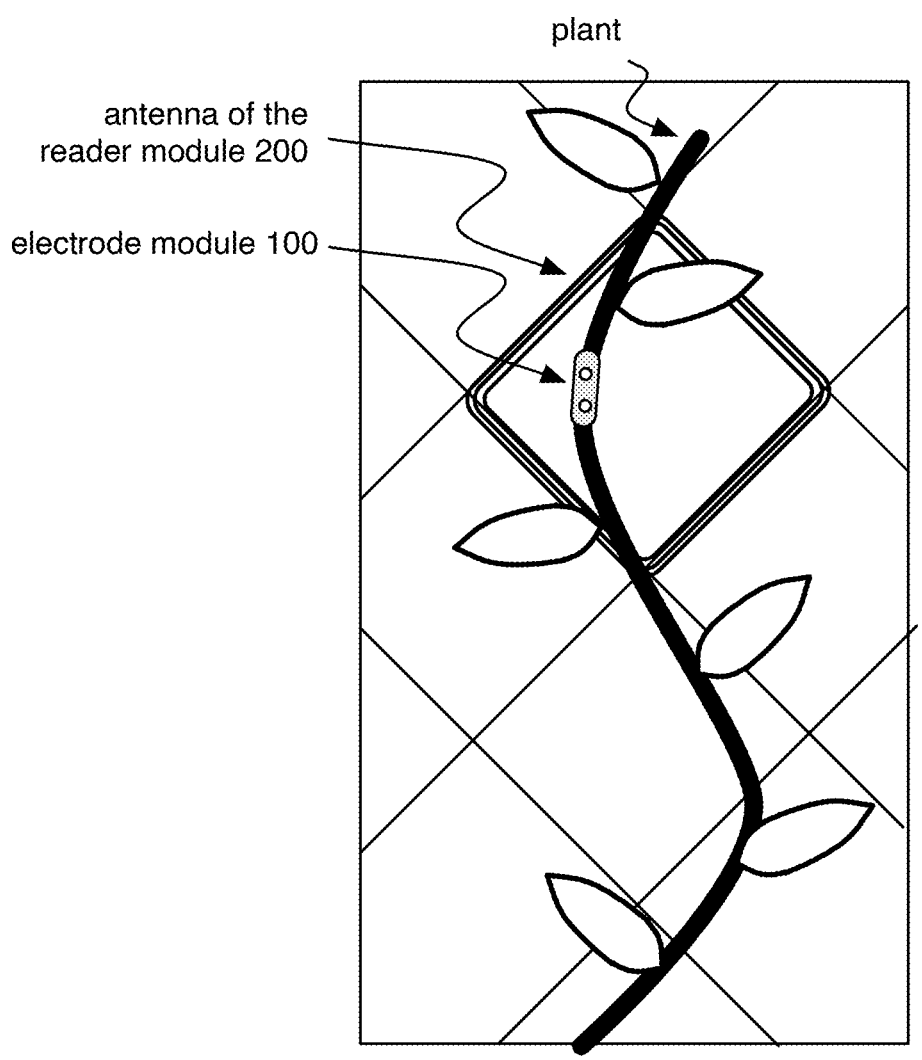
FIG. 9 depicts an example of the system, including an antenna of the reader module located on a subsection of a trellis.

In variants, when the communication module of the reader module 200 includes an antenna, the antenna can optionally form a loop coupled to a trellis, where the plant (e.g., a vine) grows on the trellis. In an example, the antenna can encircle a subsection of the trellis; an example is shown in FIG. 9. In a specific example, the communication module of the reader module 200 can communicate with one or more electrode modules 100 (e.g., communication module(s) of one or more electrode modules 100) that are located within and/or near (e.g., within 100 cm, within 50 cm, within 10 cm, within 5 cm, etc.) the trellis subsection.

The antenna can optionally be shielded. An example is shown in FIG. 2C. For example, the antenna can be shielded using segmented shielding. Segmented shielding can optionally include a set of shielding components (e.g., shielding material) arranged around an outer perimeter of the antenna. In a specific example, segmented shielding can prevent the electromagnetic field of the antenna from radiating outwards from the pot to neighboring pots. Segmented shielding (e.g., as compared to a continuous cylinder) can optionally help reduce or prevent eddy currents that would detune the antenna.

The antenna can optionally be coupled to a plant pot and/or positioned within soil contained within the plant pot. In specific examples, the antenna can be coupled to the rim of the plant pot (e.g., the top surface of the rim, embedded within the rim of the plant pot, etc.), coupled to the surface of the plant pot (e.g., coupled to the outer walls, coupled to the inner walls, coupled to the top of the rim, etc.), embedded within the plant pot (e.g., within the walls of the plant pot, within the rim of the plant pot, etc.), and/or otherwise coupled to the plant pot. In a specific example, as plant pot size increases, the diameter of the antenna loops increase, which can increase the range of the antenna (e.g., such that the range can increase with plant size). The antenna can be positioned at a height that is above the top surface of the soil, crossing the top surface of the soil (e.g., where a portion of the antenna is above the top surface and a portion of the antenna is below the top surface), and/or below the top surface of the soil. For example, an antenna can be at least partially positioned at a height below the top surface of the soil. In variants, when the communication module includes multiple antennas (e.g., each antenna configured to interface with a different electrode module), the multiple antennas can lie within the same plane and/or lie within different planes. In variants, when the communication module includes multiple antennas, the multiple antennas can be at the same height (e.g., the multiple antennas lie concentrically in the same horizontal plane) and/or different heights (e.g., the multiple antennas lie in parallel horizontal planes; an example is shown in FIG. 2B). For example, a first antenna can be positioned at a first height, and a second antenna can be positioned at a second height. In a specific example, the first height can be above the top surface of the soil, and the second height can be below the top surface of the soil. In variants, when at least one antenna is at least partially positioned at a height below the top surface of the soil, a signal quality metric of a signal received by that antenna (e.g., a differential signal from an electrode module) can optionally be used to determine a hydration state (e.g., a hydration state of the soil and/or a hydration state of the plant). In an illustrative example, if the signal quality metric decreases (e.g., beyond a threshold value), it can be assumed that the soil was watered.

In an example, the system can include: a pot, wherein a plant is positioned within the pot; a reader module that includes a communication module (e.g., a first communication module) that includes a reader module antenna (e.g., first reader module antenna) coupled to the pot (e.g., wherein the reader module antenna encircles a base of the plant); and an electrode module (e.g., first electrode module) coupled to the plant. In a specific example, the electrode module (e.g., first electrode module) can include: a first electrode (e.g., wherein a portion of the first electrode is embedded in the plant); a second electrode, (e.g., wherein a portion of the second electrode is embedded in the plant); an integrated circuit (e.g., first integrated circuit) configured to record a differential signal (e.g., first differential signal) from the first electrode and the second electrode; and an electrode module antenna (e.g., first electrode module antenna) configured to transmit the differential signal to the communication module. In an example, the system can further include a processing system, configured to: receive the differential signal from the communication module, and determine an environmental parameter (e.g., stress state) of the plant based on the differential signal. In an example, the reader module can further include a second communication module that includes a second reader module antenna coupled to the pot (e.g., wherein the second reader module antenna encircles the base of the plant), and the system can further include a second electrode module coupled to the plant. In a specific example, the second electrode module can include: a third electrode (e.g., wherein a portion of the third electrode is embedded in the plant); a fourth electrode (e.g., wherein a portion of the fourth electrode is embedded in the plant); a second integrated circuit configured to record a second differential signal from the third electrode and the fourth electrode; and a second electrode module antenna configured to transmit the second differential signal to the second communication module. In a specific example, the first electrode module antenna can be configured to transmit the first differential signal to the first communication module at a first wavelength, and the second electrode module antenna can be configured to transmit the second differential signal to the second communication module at a second wavelength. In a specific example, the system can further include a processing system, configured to: receive the first differential signal from the first communication module; receive the second differential signal from the second communication module; and determine an environmental parameter (e.g., stress state) of the plant based on the first differential signal and the second differential signal. In a specific example, the communication module (e.g., the first and/or second communication module) can be an RFID reader.

The communication module of the reader module 200 can optionally additionally or alternatively be used to transmit and/or receive signals from plant-care objects and/or detect the nearby presence of other nearby pots or plants enabled with systems described herein. Examples of plant-care objects include: bottles of nutrient solution, watering cans, hoses, spray bottles, fertilizer, plant-care products therein (e.g., nutrient solution, water, fertilizer, etc.), and/or any other plant-care systems. For example, the communication module can be used to detect the addition of a product to the plant based on detecting the proximity of the associated plant-care object. In this example, the communication module can function as a supplementary sensor, where this plant-care data can be supplemental data (e.g., used to determine the environmental parameter). In another example, the addition of a plant-care product can be detected and/or confirmed by an electrical signal recorded from the plant. In a specific example, subsequent decoding of plant health states can be attributed to this product's addition, and/or used to provide appropriate feedback and/or marketing advice to the user.

However, the communication module of the reader module 200 can be otherwise configured.

The reader module 200 can optionally include a power source, which functions to power one or more communication modules, the processing system, one or more electrode modules 100 (via communication module(s)), and/or any other components. For example, two or more communication modules (e.g., a first RFID reader and a second RFID reader) in the reader module 200 can be powered by a shared power source. The power source can optionally include all or a portion of the supplementary RF module 300. In specific examples, the power source can include one or more of: a battery (e.g., nickel metal hydride battery, coin cell battery, etc.), the supplementary RF module 300 (e.g., power derived from RF energy harvesting), solar power, wind power, thermal energy, vibration energy, energy harvested from plant motion (e.g., leaf motion), energy harvested from the soil (e.g., inserting two electrodes of different types in the soil to act as a battery), electrical outlet, and/or any other source of energy. The power source can operate between 1V-120V or any range or value therebetween (e.g., 1V-5V, 3.3V, etc.), but can alternatively operate at less than 1V or greater than 120V. The power source can include a converter, a rectifier, a voltage regulator, a battery manager, other electronic components (e.g., PCB, capacitor, resistor, inductor, amplifiers, etc.), and/or any other suitable components. However, the power source can be otherwise configured.

The reader module 200 can optionally include a local processing system, which functions to receive data from one or more communication modules, control the one or more communication modules to send signals, and/or process and/or store data from the one or more communication modules. The local processing system can optionally additionally or alternatively control one or more of: the supplementary RF module 300, the supplementary sensor 400, the stimulus module 500, and/or any system components. The local processing system can optionally include all or a portion of the processing system 600. However, the local processing system can be otherwise configured.

However, the reader module 200 can be otherwise configured.

The system can optionally include a supplementary radio frequency (RF) module 300, which functions to power one or more components of the system, collect RF energy, transmit RF signals, receive RF signals, and/or a combination thereof. The supplementary RF module 300 can be connected to, be a component of, and/or include: the electrode module 100, the reader module 200, and/or any other system components.

Figure 4A:
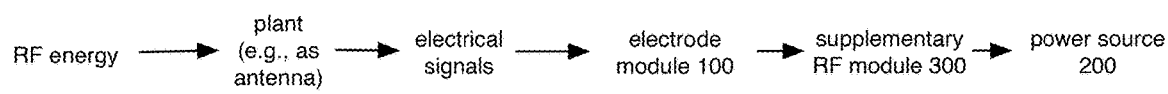
FIG. 4A depicts an example of collecting radio frequency (RF) energy for RF energy harvesting.

In a first variant, the supplementary RF module 300 can harvest energy (e.g., the power source of the reader module 200 can include the supplementary RF module 300). An example is shown in FIG. 4A. For example, the plant's natural structure and conductive tissues can function as an antenna to collect ambient RF energy as electrical current; the electrical current can be collected at the electrode module 100, and converted and stored as energy by the supplementary RF module 300. In an example, the supplementary RF module 300 can include a rectifier (e.g., for AC to DC conversion), one or more capacitors (e.g., 2 capacitors), and/or any other electrical conversion and/or energy storage systems. All or a portion of the supplementary RF module circuit (e.g., including an electrode) can optionally be placed in soil (e.g., to increase efficiency of the energy harvesting). One or more plant leaves (e.g., an upper surface of one or more leaves) can optionally be coated to increase energy collection. For example, the coating material can be an elastomeric material (e.g., a silicone elastomer prepolymer). In a specific example, the amount of collected RF energy can be dependent on the plant characteristics, including: variegation, volume of conductive tissue, geometry (e.g., structure, arrangement, etc.) of conductive tissue bundles, plant geometry (e.g., height, leaf number, branch arrangement, etc.). The plant can optionally be selected based on the corresponding plant characteristics to increase RF energy collection.

Figure 4B:
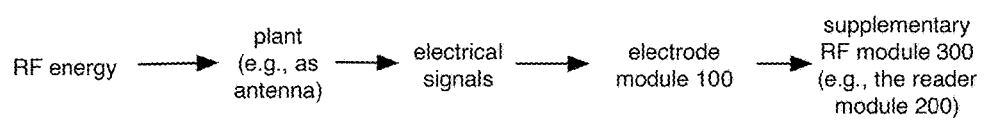
FIG. 4B depicts an example of collecting RF energy as supplemental data (e.g., to detect user devices, for geolocation, etc.).

In a second variant, the supplementary RF module 300 can collect RF energy as supplemental data (e.g., the supplementary RF module 300 functions as a supplementary sensor 400). In this variant, the supplementary RF module 300 can be or include the reader module 200. An example is shown in FIG. 4B. For example, electrical signals collected by the electrode module 100 can correspond to RF energy (e.g., RF signals), wherein these electrical signals can be recorded by the reader module 200. In a specific example, the collected RF energy can be used to detect nearby devices emitting RF energy (e.g., phones, other user devices, etc.; indicating humans near the plant). In another specific example, collected RF signals can be used to geolocate the plant.

Figure 4C:
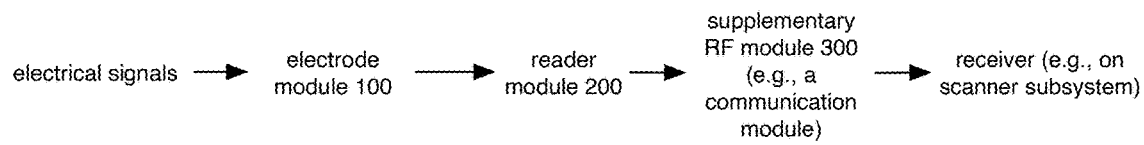
FIG. 4C depicts an example of transmitting data using RF signals.

In a third variant, the supplementary RF module 300 can be or include a communication module (e.g., a transmitter) of the reader module 200, transmitting data (e.g., processed or unprocessed electrical signals) to a receiver (e.g., a receiver on a scanning subsystem, the remote processing system, etc.). An example is shown in FIG. 4C. In a first example, the supplementary RF module 300 can write data (e.g., from the reader module 200) onto an RFID tag, wherein the RFID tag can broadcast the data (e.g., in real time, in batches, etc.). The RFID tag can be active or passive. In a second example, the plant can be used as an antenna to transmit the data.

Figure 4D:
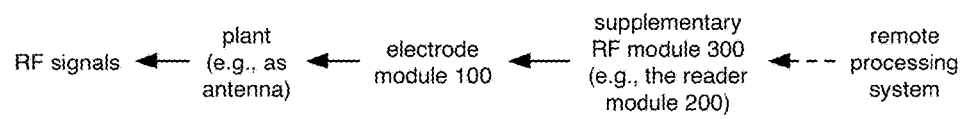
FIG. 4D depicts an example of broadcasting RF signals.

In a fourth variant, the supplementary RF module 300 can broadcast RF signals using the plant as an antenna. In this variant, the supplementary RF module 300 can be or include the reader module 200. An example is shown in FIG. 4D. For example, the reader module 200 can control the electrode module to deliver electrical signals to the plant, wherein the plant can function as an antenna to deliver RF signals corresponding to the delivered electrical signals.

However, the supplementary RF module 300 can be otherwise configured.

The system can optionally include a supplementary sensor 400, which functions to collect additional data (e.g., supplemental data) associated with the plant and/or any other element of the environment (e.g., soil, air, light, a human near the plant, etc.). In specific examples, the supplemental data can be used to label the electrical signals for model training (e.g., the supplemental data can function as a training target), provide contextual information for the electrical signals (e.g., the supplemental data can function as additional model inputs), determine environmental parameters, and/or be otherwise used in relation to the electrical signals. The supplementary sensor 400 can be connected to the processing system 600 (e.g., a local and/or remote processing system), the power source, and/or any other components of the system. The system can include between 1-50 supplementary sensors or any range or value therebetween (e.g., 1-5, 1-10, etc.), but can alternatively include greater than 50 or no supplementary sensors.

The supplementary sensor 400 can be local to the plant (e.g., part of a local subsystem), remote from the plant (e.g., a remote sensor connected to a remote processing system, part of the scanner subsystem, etc.), and/or otherwise located. Examples of the supplementary sensor 400 can include: moisture sensor, temperature sensor, gas detection sensor (e.g., detecting Volatile Organic Compounds, detecting toxins, etc.), motion sensor, weight sensor (e.g., load cell), audio sensor, light sensor, pH sensor, RF sensor (e.g., the supplementary RF module 300), camera, landslide sensor, pressure sensor, accelerometer, vibration sensor, and/or any other sensor. Additionally or alternatively, the supplementary sensor can be or include components that are not designed as sensors, but can be used as such (e.g., solar panels providing power to the system, wherein the voltage from these solar panels can be used in place of a discrete light sensors, by recording the output voltages as a proxy for light levels).

In an example, the supplementary sensor 400 can be used to detect supplemental data associated with watering events. In a first specific example, the supplementary sensor 400 can include a load cell (e.g., an internal load cell in the pot) to measure the weight of the plant and soil. The measured weight can be used to determine a soil hydration level. In a second specific example, communication elements (e.g., the reader module 200 antennas and/or shielding segments), can be used (e.g., intermittently) as capacitive sensors to detect a localized capacitive change corresponding to a change in the moisture content of the soil. In variants, an environmental parameter (e.g., hydration state) can be determined based on the supplemental data associated with watering events (e.g., measured weight, capacitive changes, etc.) and the electrical signals recorded from the plant.

However, the supplementary sensor 400 can be otherwise configured.

The system can optionally include a stimulus module 500, which functions to apply a stimulus to the plant. Specific examples of stimuli include: light stimuli (e.g., a light pulse), temperature stimuli, electrical stimuli (e.g., an electrical pulse, electrical noise, etc.), hydration stimuli (e.g., watering the plant, dehydrating the plant, etc.), vibrational stimuli, pressure stimuli, and/or any other external stimuli.

In examples, the stimulus can be used to assess the plant condition (e.g., diagnose the plant), calibrate a model, train a model, and/or to improve the health of the plant. In a specific example the stimulus module 500 can be controlled according to a stimulation pattern (e.g., electrical stimulation pattern, illumination pattern, etc.), wherein the stimulation pattern can be used to determine the environmental parameter (e.g., the stress state of the plant).

In a first embodiment, the stimulus can be an electrical signal (e.g., electrical pulse). In an example, the stimulus module 500 can include the electrode module 100, wherein one or more electrodes in the electrode module 100 deliver the electrical signal stimulus to the plant. In a specific example, the electrical signal can be designed to simulate a naturally occurring EC signal in the plant. In another specific example, the electrical signal can be a non-biologically based signal (e.g., a square pulse). In another specific example, the stimulus can be a series of consecutive electrical pulses (e.g., optionally designed to replicate a series of electrical information naturally transmitted in the plant). In a second embodiment, the stimulus can be electrical noise. In an example, the stimulus module 500 can include an external antenna that outputs electrical noise. The electrical noise can be between 20 Hz-150 Hz or any range or value therebetween (e.g., 40 Hz-70 Hz, approximately 60 Hz, at least 60 Hz, etc.), but can alternatively be greater than 150 Hz. Additionally or alternatively, the electrical noise can be a random mixture of different frequencies (e.g., white noise) and/or a non-random mixture of different frequencies. In a third embodiment, the stimulus can be a light pulse. In a specific example, the stimulus module 500 can include a light source (e.g., an LED, a μLED, and/or any other light emission system) that applies the light pulse to the stem of the plant. For example, an electrode in the electrode module 100 can be embedded in the plant at electrode site (e.g., implantation location), and a light source (e.g., LED) can be configured to illuminate the plant at or near the electrode site according to an illumination pattern. In a specific example, the environmental parameter (e.g., the stress state of the plant) can be determined based on a signal received from the electrode module (e.g., a differential signal) and the illumination pattern. The light source (e.g., LED) can optionally be positioned between 1 mm-1 m from the electrode in the electrode module 100 or any range or value therebetween (e.g., less than 20 cm, less than 10 cm, less than 5 cm, less than 2 cm, less than 1 cm, etc.). The light source can optionally be positioned between a pair of electrodes in the electrode module 100. In variants, this placement can increase the probability of obtaining a consistent light response because the electrical signals (e.g., information flow) traveling in either direction will hit one of the pair of electrodes and/or because electrodes on either side of the light source can be holding the plant (e.g., a vine) against the light source (e.g., which can ensure a good connection, flush with the side of the plant stem). The LED can optionally be coupled to the surface of the plant (e.g., illuminating the surface of the plant) and/or embedded within the plant.

However, the stimulus module 500 can be otherwise configured.

The system can optionally include a processing system 600, which functions to sample electrical signals and/or otherwise receive data, process electrical signals, determine an environmental parameter (e.g., a stress state of the plant), control one or more system components (e.g., one or more communication modules, the supplementary RF module 300, the stimulus module 50*o*, etc.), and/or perform other suitable functions. The processing system 600 can be local, remote, distributed, and/or otherwise arranged relative to any other system or module.

In variants, the processing system 600 can include a local processing system on the reader module 200 and a remote processing system communicatively connected to the reader module 200. In an example, the processing system can include a local processing system on the reader module 200 (e.g., coupled to the pot) and a remote processing system communicatively connected to the local processing system, wherein the local processing system can be configured to receive signal(s) from one or more communication modules of the reader module 200, and the remote processing system can be configured to receive the signal(s) from the local processing system, and determine the environmental parameter (e.g., stress state of the plant) based on the signal(s). In a specific example, the signal(s) can include a differential signal from each of a set of RFID readers (e.g., a first differential signal and a second differential signal from a first RFID reader and a second RFID reader, respectively), where each differential signal was recorded by an electrode module.

The processing system 600 can include one or more: CPUs, GPUs, TPUs, custom FPGA/ASICS, microprocessors, microcontrollers (e.g., STM32, ESP32-S3, etc.), servers, cloud computing, other electronic components (e.g., PCB, capacitor, resistor, inductor, amplifiers, etc.), and/or any other suitable components.

In a first variant, the processing system 600 can sample electrical signals via the electrode module 100. The processing system 600 can sample electrical signals at a frequency between 0.001 Hz-10 kHz or any range or value therebetween (e.g., 10 Hz-500 Hz, 250 Hz, etc.), but can alternatively sample electrical signals at a frequency less than 0.001 Hz or greater than 10 kHz. The processing system 600 can optionally sample electrical signals using a sampling pattern. In a first illustrative example, the electrode module 100 can iteratively: sample electrical signals at a first sampling frequency for a first time period, and sample electrical signals at a second sampling frequency for a second time period. In a second illustrative example, the electrode module 100 can iteratively: sample electrical signals at a sampling frequency for a first time period, and pause sampling for a second time period. RF energy harvesting can optionally be performed during a pause in electrical signal sampling (e.g., between each sample, during an extended pause, etc.).

In a second variant, the processing system 600 (e.g., a local processing system) can process the electrical signals. Processing the electrical signals can include downsampling, filtering (e.g., digital filtering), amplifying, converting, determining signal directionality (e.g., comparing signals from two different recording electrodes), a combination thereof, and/or otherwise processing the electrical signals.

In a third variant, the processing system 600 (e.g., a remote processing system) can determine an environmental parameter based on the electrical signals (e.g., electrical signals retrieved from a database). The environmental parameter can include: a state (e.g., condition) of the one or more plants (e.g., a plant from which the electrical signals are received, a neighboring plant, etc.), a state of a human or other animal, a state of the soil (e.g., water, nutrients, and/or any other components within the soil), a state of the air, a state of water, light intensity, a stimulus, and/or parameter associated with any other element of the environment internal and/or external to the plant. In an example, the environmental parameter can include a stress state of a plant. The stress state can include a type of stress and/or a level of stress. Examples of types of stress include: general stress (e.g., an overall stress measure), hydration stress (e.g., dehydration or overhydration), light stress (e.g., lack of light or an overexposure to light), temperature stress (e.g., excessive heat, excessive cold, excessive temperature variability, etc.), nutrient stress (e.g., lack of one or more nutrients in the soil), and/or any other type of stress. The level of stress can be qualitative, quantitative, relative, discrete, continuous, a classification, numeric, binary (e.g., stressed/not stressed), and/or be otherwise characterized.

The environmental parameter can be determined based on: the electrical signal(s) acquired via one or more electrode modules 100 (e.g., one or more differential signals recorded by one or more electrode modules 100). Additionally or alternatively, the environmental parameter can be determined based on one or more of: a signal quality metric, a stimulation pattern of a stimulus module (e.g., an illumination pattern of an LED), supplemental data (e.g., from one or more supplementary sensors), and/or any other information. The signal quality metric can optionally be determined based on the acquired electrical signal(s) (e.g., one or more differential signals recorded by one or more electrode modules 100).

The environmental parameter can optionally be determined using one or more models. The models can use classical or traditional approaches, machine learning approaches, and/or other approaches. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, FNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naiive Bayes, Markov, etc.), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable architecture. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture. The models can include less than 10, tens, hundreds, thousands, tens of thousands, hundreds of thousands, and/or any other number of parameters (e.g., weights, biases, etc.). The models can extract data features (e.g., feature values, feature vectors, high-dimensional features, embeddings in a high-dimensional space with hundreds or thousands of dimensions, human-unintelligible features, etc.) from the input data, and determine the output based on the extracted features. However, the models can otherwise determine the output based on the input data.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data.

However, the processing system 600 can be otherwise configured.

However, the system can be otherwise configured.

4. Specific Examples

A numbered list of specific examples of the technology described herein are provided below. A person of skill in the art will recognize that the scope of the technology is not limited to and/or by these specific examples.

Specific Example 1. A system, comprising: a pot, wherein a plant is positioned within the pot; a reader module comprising: an RFID reader comprising a reader module antenna coupled to the pot, wherein the reader module antenna encircles a base of the plant; an electrode module coupled to the plant, the electrode module comprising: a first electrode, wherein a portion of the first electrode is embedded in the plant; a second electrode, wherein a portion of the second electrode is embedded in the plant; an integrated circuit configured to record a differential signal from the first electrode and the second electrode; and an electrode module antenna configured to transmit the differential signal to the RFID reader.

Specific Example 2. The system of Specific Example 1, wherein the electrode module antenna is configured to transmit the differential signal to the RFID reader at a first wavelength, wherein the reader module further comprises a second RFID reader comprising a second reader module antenna coupled to the pot, wherein the second reader module antenna encircles the base of the plant, wherein the system further comprises: a second electrode module coupled to the plant, the second electrode module comprising: a third electrode, wherein a portion of the third electrode is embedded in the plant; a fourth electrode, wherein a portion of the fourth electrode is embedded in the plant; a second integrated circuit configured to record a second differential signal from the third electrode and the fourth electrode; and a second electrode module antenna configured to transmit the second differential signal at a second wavelength to the second RFID reader.

Specific Example 3. The system of Specific Example 2, wherein the electrode module is coupled to the plant at a first height, wherein the second electrode module is coupled to the plant at a second height, the second height lower than the first height, wherein the first wavelength is longer than the second wavelength.

Specific Example 4. The system of any of Specific Examples 1-3, wherein the reader module antenna is embedded within the pot, wherein the reader module antenna is shielded using segmented shielding.

Specific Example 5. The system of any of Specific Examples 1-4 wherein the pot contains soil, wherein the reader module antenna is at least partially positioned at a height below a top surface of the soil.

Specific Example 6. The system of any of Specific Examples 1-5, wherein a hydration state is determined based on a signal quality metric, the signal quality metric determined based on the differential signal.

Specific Example 7. The system of any of Specific Examples 1-6, wherein the portion of the first electrode is embedded in the plant at a first electrode site, wherein the portion of the second electrode is embedded in the plant at a second electrode site, wherein a distance between the first implantation and the second electrode site is between 1 cm-5 cm.

Specific Example 8. The system of any of Specific Examples 1-7, wherein the portion of the first electrode is embedded in a stem of the plant, wherein a tip of the first electrode protrudes out of the stem of the plant, and wherein the portion of the second electrode is embedded in the stem of the plant, wherein a tip of the second electrode protrudes out of the stem of the plant.

Specific Example 9. The system of any of Specific Examples 1-8, wherein the portion of the first electrode is embedded in the plant at an electrode site, wherein the system further comprises an LED configured to illuminate the plant at the electrode site according to an illumination pattern.

Specific Example 10. The system of Specific Example 9, wherein a stress state of the plant is determined based on the differential signal and the illumination pattern.

Specific Example 11. The system of any of Specific Examples 1-10, wherein the first electrode and the second electrode each comprise stainless steel.

Specific Example 12. The system of any of Specific Examples 1-11, wherein a stress state of the plant is determined based on the differential signal.

Specific Example 13. The system of Specific Example 12, wherein the stress state comprises a hydration state.

Specific Example 14. A system, comprising: a pot, wherein a plant is positioned within the pot; a reader module, comprising: a first RFID reader comprising a first reader module antenna coupled to the pot, wherein the first reader module antenna encircles a base of the plant; a second RFID reader comprising a second reader module antenna coupled to the pot, wherein the second reader module antenna encircles the base of the plant; a first electrode module coupled to the plant, the first electrode module comprising: a first electrode, wherein a portion of the first electrode is embedded in the plant; a second electrode, wherein a portion of the second electrode is embedded in the plant; a first integrated circuit configured to record a first differential signal from the first electrode and the second electrode; and a first electrode module antenna configured to transmit the first differential signal to the first RFID reader at a first wavelength; a second electrode module coupled to the plant, the second electrode module comprising: a third electrode, wherein a portion of the third electrode is embedded in the plant; a fourth electrode, wherein a portion of the fourth electrode is embedded in the plant; a second integrated circuit configured to record a second differential signal from the third electrode and the fourth electrode; and a second electrode module antenna configured to transmit the second differential signal at a second wavelength to the second RFID reader; and a processing system, configured to: receive the first differential signal from the first RFID reader; receive the second differential signal from the second RFID reader; and determine a stress state of the plant based on the first differential signal and the second differential signal.

Specific Example 15. The system of Specific Example 14, wherein the processing system comprises a local processing system coupled to the pot and a remote processing system communicatively connected to the local processing system, wherein the local processing system is configured to receive the first differential signal from the first RFID reader and receive the second differential signal from the second RFID reader, wherein the remote processing system is configured to: receive the first differential signal and the second differential signal from the local processing system; and determine the stress state of the plant based on the first differential signal and the second differential signal.

Specific Example 16. The system of any of Specific Examples 14-15, wherein the first reader module antenna and the second reader module antenna lie in the same plane.

Specific Example 17. The system of any of Specific Examples 14-16, wherein the first electrode module is coupled to the plant at a first height, wherein the second electrode module is coupled to the plant at a second height, the second height lower than the first height, wherein the first wavelength is longer than the second wavelength.

Specific Example 18. The system of any of Specific Examples 14-17, wherein the first RFID reader and the second RFID reader are powered by a shared power source.

Specific Example 19. The system of any of Specific Examples 14-18, wherein the portion of the first electrode is embedded in the plant at a first electrode site, wherein the first electrode module further comprises an LED configured to illuminate the plant at the first electrode site according to an illumination pattern, wherein the processing system is configured to determine the stress state is further based on the illumination pattern.

Specific Example 20. The system of any of Specific Examples 14-19, wherein the stress state comprises a hydration state.

All references cited herein are incorporated by reference in their entirety, except to the extent that the incorporated material is inconsistent with the express disclosure herein, in which case the language in this disclosure controls.

As used herein, "substantially" or other words of approximation (e.g., "about," "approximately," etc.) can be within a predetermined error threshold or tolerance of a metric, component, or other reference (e.g., within +/−0.001%, +/−0.01%, +/−0.1%, +/−1%, +/−2%, +/−5%, +/−10%, +/−15%, +/−20%, +/−30%, any range or value therein, of a reference).

Optional elements, which can be included in some variants but not others, are indicated in broken line in the figures.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system, comprising:
   a pot, wherein a plant is positioned within the pot;
   a reader module comprising: an RFID reader comprising a reader module antenna coupled to the pot, wherein the reader module antenna encircles a base of the plant;
   an electrode module coupled to the plant, the electrode module comprising:
      a first electrode, wherein a portion of the first electrode is embedded in the plant;
      a second electrode, wherein a portion of the second electrode is embedded in the plant;
      an integrated circuit configured to record a differential signal from the first electrode and the second electrode; and
      an electrode module antenna configured to transmit the differential signal to the RFID reader.

2. The system of claim 1, wherein the electrode module antenna is configured to transmit the differential signal to the RFID reader at a first wavelength, wherein the reader module further comprises a second RFID reader comprising a second reader module antenna coupled to the pot, wherein the second reader module antenna encircles the base of the plant, wherein the system further comprises: a second electrode module coupled to the plant, the second electrode module comprising:
   a third electrode, wherein a portion of the third electrode is embedded in the plant;
   a fourth electrode, wherein a portion of the fourth electrode is embedded in the plant;
   a second integrated circuit configured to record a second differential signal from the third electrode and the fourth electrode; and
   a second electrode module antenna configured to transmit the second differential signal at a second wavelength to the second RFID reader.

3. The system of claim 2, wherein the electrode module is coupled to the plant at a first height, wherein the second electrode module is coupled to the plant at a second height, the second height lower than the first height, wherein the first wavelength is longer than the second wavelength.

4. The system of claim 1, wherein the reader module antenna is embedded within the pot, wherein the reader module antenna is shielded using segmented shielding.

5. The system of claim 1, wherein the pot contains soil, wherein the reader module antenna is at least partially positioned at a height below a top surface of the soil.

6. The system of claim 5, wherein a hydration state is determined based on a signal quality metric, the signal quality metric determined based on the differential signal.

7. The system of claim 1, wherein the portion of the first electrode is embedded in the plant at a first electrode site, wherein the portion of the second electrode is embedded in the plant at a second electrode site, wherein a distance between the first implantation and the second electrode site is between 1 cm-5 cm.

8. The system of claim 1, wherein the portion of the first electrode is embedded in a stem of the plant, wherein a tip of the first electrode protrudes out of the stem of the plant, and wherein the portion of the second electrode is embedded in the stem of the plant, wherein a tip of the second electrode protrudes out of the stem of the plant.

9. The system of claim 1, wherein the portion of the first electrode is embedded in the plant at an electrode site, wherein the system further comprises an LED configured to illuminate the plant at the electrode site according to an illumination pattern.

10. The system of claim 9, wherein a stress state of the plant is determined based on the differential signal and the illumination pattern.

11. The system of claim 1, wherein the first electrode and the second electrode each comprise stainless steel.

12. The system of claim 1, wherein a stress state of the plant is determined based on the differential signal.

13. The system of claim 12, wherein the stress state comprises a hydration state.

14. A system, comprising:
a pot, wherein a plant is positioned within the pot;
a reader module, comprising:
  a first RFID reader comprising a first antenna coupled to the pot, wherein the first reader module antenna encircles a base of the plant; and
  a second RFID reader comprising a second antenna coupled to the pot, wherein the second reader module antenna encircles the base of the plant;
a first electrode module coupled to the plant, the first electrode module comprising:
  a first electrode, wherein a portion of the first electrode is embedded in the plant;
  a second electrode, wherein a portion of the second electrode is embedded in the plant;
  a first integrated circuit configured to record a first differential signal from the first electrode and the second electrode; and
  a first electrode module antenna configured to transmit the first differential signal to the first RFID reader at a first wavelength;
a second electrode module coupled to the plant, the second electrode module comprising:
  a third electrode, wherein a portion of the third electrode is embedded in the plant;
  a fourth electrode, wherein a portion of the fourth electrode is embedded in the plant;
  a second integrated circuit configured to record a second differential signal from the third electrode and the fourth electrode; and
  a second electrode module antenna configured to transmit the second differential signal at a second wavelength to the second RFID reader; and
a processing system, configured to:
  receive the first differential signal from the first RFID reader;
  receive the second differential signal from the second RFID reader; and
  determine a stress state of the plant based on the first differential signal and the second differential signal.

15. The system of claim 14, wherein the processing system comprises a local processing system coupled to the pot and a remote processing system communicatively connected to the local processing system, wherein the local processing system is configured to receive the first differential signal from the first RFID reader and receive the second differential signal from the second RFID reader, wherein the remote processing system is configured to:
  receive the first differential signal and the second differential signal from the local processing system; and
  determine the stress state of the plant based on the first differential signal and the second differential signal.

16. The system of claim 14, wherein the first reader module antenna and the second reader module antenna lie in the same plane.

17. The system of claim 14, wherein the first electrode module is coupled to the plant at a first height, wherein the second electrode module is coupled to the plant at a second height, the second height lower than the first height, wherein the first wavelength is longer than the second wavelength.

18. The system of claim 14, wherein the first RFID reader and the second RFID reader are powered by a shared power source.

19. The system of claim 14, wherein the portion of the first electrode is embedded in the plant at a first electrode site, wherein the first electrode module further comprises an LED configured to illuminate the plant at the first electrode site according to an illumination pattern, wherein the processing system is configured to determine the stress state is further based on the illumination pattern.

20. The system of claim 14, wherein the stress state comprises a hydration state.

* * * * *